United States Patent
Lee

(10) Patent No.: US 11,242,125 B2
(45) Date of Patent: Feb. 8, 2022

(54) ADAPTIVE HARNESS TO STABILIZE AIRSHIPS IN HIGH WINDS AND METHOD

(71) Applicant: ONWARD TECHNOLOGIES, LLC., Lathan, NY (US)

(72) Inventor: Yee Chun Lee, Millbrae, CA (US)

(73) Assignee: ONWARD TECHNOLOGIES, LLC, Latham, NY (US)

( * ) Notice: Subject to any disclaimer, the term of this patent is extended or adjusted under 35 U.S.C. 154(b) by 333 days.

(21) Appl. No.: 16/155,852

(22) Filed: Oct. 9, 2018

(65) Prior Publication Data

US 2020/0108903 A1   Apr. 9, 2020

(51) Int. Cl.
B64B 1/66 (2006.01)
B64B 1/06 (2006.01)
B64B 1/58 (2006.01)

(52) U.S. Cl.
CPC .......... B64B 1/66 (2013.01); B64B 1/06 (2013.01); B64B 1/58 (2013.01)

(58) Field of Classification Search
CPC .... B64B 1/02; B64B 1/06; B64B 1/52; B64B 1/58; B64B 1/62; B64B 1/66; B64C 39/022; B64F 3/02
See application file for complete search history.

(56) References Cited

U.S. PATENT DOCUMENTS

| | | | | |
|---|---|---|---|---|
| 653,221 A * | 7/1900 | Deydier | .................... | B61B 5/02 104/22 |
| 1,724,890 A * | 8/1929 | Upson | ...................... | B64F 1/14 244/116 |
| 1,812,237 A * | 6/1931 | Garcia | ...................... | B64B 1/66 244/116 |
| 1,823,466 A * | 9/1931 | Powelson | ................. | B64F 1/14 244/116 |
| 1,845,229 A * | 2/1932 | Bradshaw | ................. | B64F 1/14 244/116 |
| 1,848,828 A * | 3/1932 | Griffin | ...................... | B64F 1/14 244/116 |
| 2,305,647 A * | 12/1942 | Thomasson | ............ | A61G 17/04 160/35 |
| 2,433,344 A * | 12/1947 | Crosby | ..................... | B64B 1/40 343/706 |
| 2,704,193 A * | 3/1955 | Alard | ....................... | B64B 1/66 244/116 |
| 2,783,002 A * | 2/1957 | Ney | .......................... | B64B 1/40 244/31 |

(Continued)

*Primary Examiner* — Medhat Badawi
(74) *Attorney, Agent, or Firm* — Breneman & Georges

(57) ABSTRACT

An airship dynamic adaptive harness is provided to stabilize airships and particularly a tethered aerostat in high winds and atmospheric changes. A novel adaptive device accommodates the supply of a lift gas and simultaneously controls opposing cables in a tethered harness with a cascade control system that provides an immediate and particularly the dynamic control of roll, yaw and particularly the pitch of the aerostat in response to real time environmental flight conditions and impart stability to the airship in high winds using a stability zone geometric suspension control system and enhance the duration of in flight missions. A lifting gas replenishment system and particularly a ground based lifting gas replenishment system adds long duration deployment to the dynamic adaptability to high wind conditions for long term deployment.

50 Claims, 24 Drawing Sheets

(56) References Cited

U.S. PATENT DOCUMENTS

| | | | | |
|---|---|---|---|---|
| 3,149,803 A * | 9/1964 | Petrides | B64C 39/022 | 244/17.13 |
| 3,176,935 A * | 4/1965 | White | B64D 17/78 | 244/31 |
| 3,558,083 A * | 1/1971 | Conley | B64B 1/40 | 244/33 |
| 3,972,492 A * | 8/1976 | Milne | B64B 1/06 | 244/30 |
| 3,972,493 A * | 8/1976 | Milne | B64B 1/66 | 244/115 |
| 4,165,468 A * | 8/1979 | Fry | F03D 13/20 | 290/55 |
| 4,166,596 A * | 9/1979 | Mouton, Jr. | F03D 15/00 | 244/30 |
| 4,207,026 A * | 6/1980 | Kushto | F03D 1/0608 | 416/84 |
| 4,285,481 A * | 8/1981 | Biscomb | F03D 13/20 | 244/33 |
| 4,309,006 A * | 1/1982 | Biscomb | F03D 13/20 | 244/33 |
| 4,350,896 A * | 9/1982 | Benoit | F03D 9/25 | 290/55 |
| 4,350,897 A * | 9/1982 | Benoit | F03D 9/00 | 290/55 |
| 4,350,898 A * | 9/1982 | Benoit | F03D 9/00 | 290/55 |
| 4,350,899 A * | 9/1982 | Benoit | F03D 9/25 | 290/55 |
| 4,450,364 A * | 5/1984 | Benoit | F03D 9/25 | 290/55 |
| 4,470,563 A * | 9/1984 | Engelsman | F03D 13/20 | 244/33 |
| 4,789,302 A * | 12/1988 | Gruzling | B63H 5/14 | 415/221 |
| 4,832,571 A * | 5/1989 | Carrol | F03D 13/20 | 416/132 B |
| 4,842,219 A * | 6/1989 | Jakubowski | B64F 1/14 | 182/5 |
| 5,080,302 A * | 1/1992 | Hoke | B64B 1/50 | 212/71 |
| 5,374,149 A * | 12/1994 | Lichti | E04H 6/14 | 414/234 |
| 5,431,359 A * | 7/1995 | Belie | B64B 1/66 | 244/116 |
| 5,497,962 A * | 3/1996 | Wood | B64F 1/14 | 244/116 |
| 5,509,624 A * | 4/1996 | Takahashi | B64B 1/005 | 244/115 |
| 5,836,738 A * | 11/1998 | Finney | F03D 1/04 | 415/60 |
| 6,010,093 A * | 1/2000 | Paulson | B64B 1/50 | 244/24 |
| 6,016,998 A * | 1/2000 | Allsopp | A63H 27/08 | 244/153 R |
| 6,224,015 B1 * | 5/2001 | Reinhard | B61B 7/00 | 244/24 |
| 6,224,016 B1 * | 5/2001 | Lee | B64B 1/14 | 136/245 |
| 6,231,007 B1 * | 5/2001 | Schafer | B64B 1/22 | 244/127 |
| 6,382,904 B1 * | 5/2002 | Orlov | F03D 13/20 | 415/4.5 |
| 7,055,778 B2 * | 6/2006 | Eberle | B64B 1/58 | 244/24 |
| 7,188,808 B1 * | 3/2007 | Olson | F03D 5/06 | 244/153 R |
| 7,334,757 B2 * | 2/2008 | Steinkerchner | B64B 1/66 | 244/115 |
| 7,335,000 B2 * | 2/2008 | Ferguson | F03D 3/002 | 417/7 |
| 7,582,981 B1 * | 9/2009 | Meller | F03D 1/025 | 290/44 |
| 8,020,805 B2 * | 9/2011 | Choi | B64B 1/20 | 244/30 |
| 8,152,092 B2 * | 4/2012 | Zulkowski | B64B 1/32 | 244/30 |
| 8,167,246 B1 * | 5/2012 | Mears | G09F 21/06 | 244/153 R |
| 8,253,265 B2 * | 8/2012 | Glass | F03D 1/04 | 290/55 |
| 8,539,746 B2 * | 9/2013 | Ippolito | C05F 17/40 | 57/200 |
| 8,544,788 B1 * | 10/2013 | Capper | B64B 1/28 | 244/33 |
| 9,000,605 B2 * | 4/2015 | Glass | F03D 9/32 | 290/55 |
| 9,321,518 B1 * | 4/2016 | Rabbino | F03D 5/00 | |
| 9,630,726 B2 * | 4/2017 | Cunningham | B64B 1/58 | |
| 9,789,947 B2 * | 10/2017 | Glass | B64B 1/52 | |
| 10,065,738 B2 * | 9/2018 | Palmer | B64B 1/58 | |
| 10,113,534 B2 * | 10/2018 | Sia | H02K 7/1853 | |
| 10,696,396 B2 * | 6/2020 | Buyse | B64C 39/024 | |
| 10,737,783 B2 * | 8/2020 | Buyse | B64C 27/50 | |
| 10,773,800 B2 * | 9/2020 | Buyse | B64C 39/022 | |
| 2002/0040948 A1 * | 4/2002 | Ragner | B64C 31/06 | 244/153 R |
| 2005/0103930 A1 * | 5/2005 | Silansky | H04B 7/18504 | 244/30 |
| 2007/0013196 A1 * | 1/2007 | Chen | F03D 1/04 | 290/55 |
| 2007/0126241 A1 * | 6/2007 | Olson | F03D 5/06 | 290/55 |
| 2008/0048453 A1 * | 2/2008 | Amick | F03B 17/061 | 290/44 |
| 2008/0265086 A1 * | 10/2008 | Lee | B64B 1/56 | 244/30 |
| 2009/0033098 A1 * | 2/2009 | Griffith | F03D 7/00 | 290/55 |
| 2009/0072092 A1 * | 3/2009 | Griffith | B64C 31/06 | 244/155 A |
| 2009/0200416 A1 * | 8/2009 | Lee | B64B 1/32 | 244/30 |
| 2010/0007218 A1 * | 1/2010 | Ogram | B64B 1/50 | 307/145 |
| 2010/0019091 A1 * | 1/2010 | Milanese | B63H 9/069 | 244/155 A |
| 2010/0032947 A1 * | 2/2010 | Bevirt | F03D 1/065 | 290/44 |
| 2010/0133385 A1 * | 6/2010 | Olson | G01W 1/08 | 244/155 A |
| 2010/0213718 A1 * | 8/2010 | Kelly | F03D 5/04 | 290/55 |
| 2011/0315810 A1 * | 12/2011 | Petrov | B64C 39/024 | 244/17.23 |
| 2012/0049533 A1 * | 3/2012 | Kelly | F03D 9/11 | 290/55 |
| 2012/0181381 A1 * | 7/2012 | Vercesi | B64B 1/30 | 244/96 |
| 2013/0075523 A1 * | 3/2013 | Vermillion | B64B 1/50 | 244/96 |
| 2014/0124616 A1 | 5/2014 | Greco et al. | | |
| 2016/0122014 A1 * | 5/2016 | Jang | G01C 21/005 | 244/25 |
| 2016/0139601 A1 * | 5/2016 | Vermillion | G05D 1/0816 | 244/96 |
| 2016/0178033 A1 * | 6/2016 | Chung | F16H 3/74 | 475/269 |
| 2018/0186443 A1 * | 7/2018 | Belik | B64C 39/024 | |
| 2020/0108903 A1 * | 4/2020 | Lee | B64B 1/66 | |

\* cited by examiner

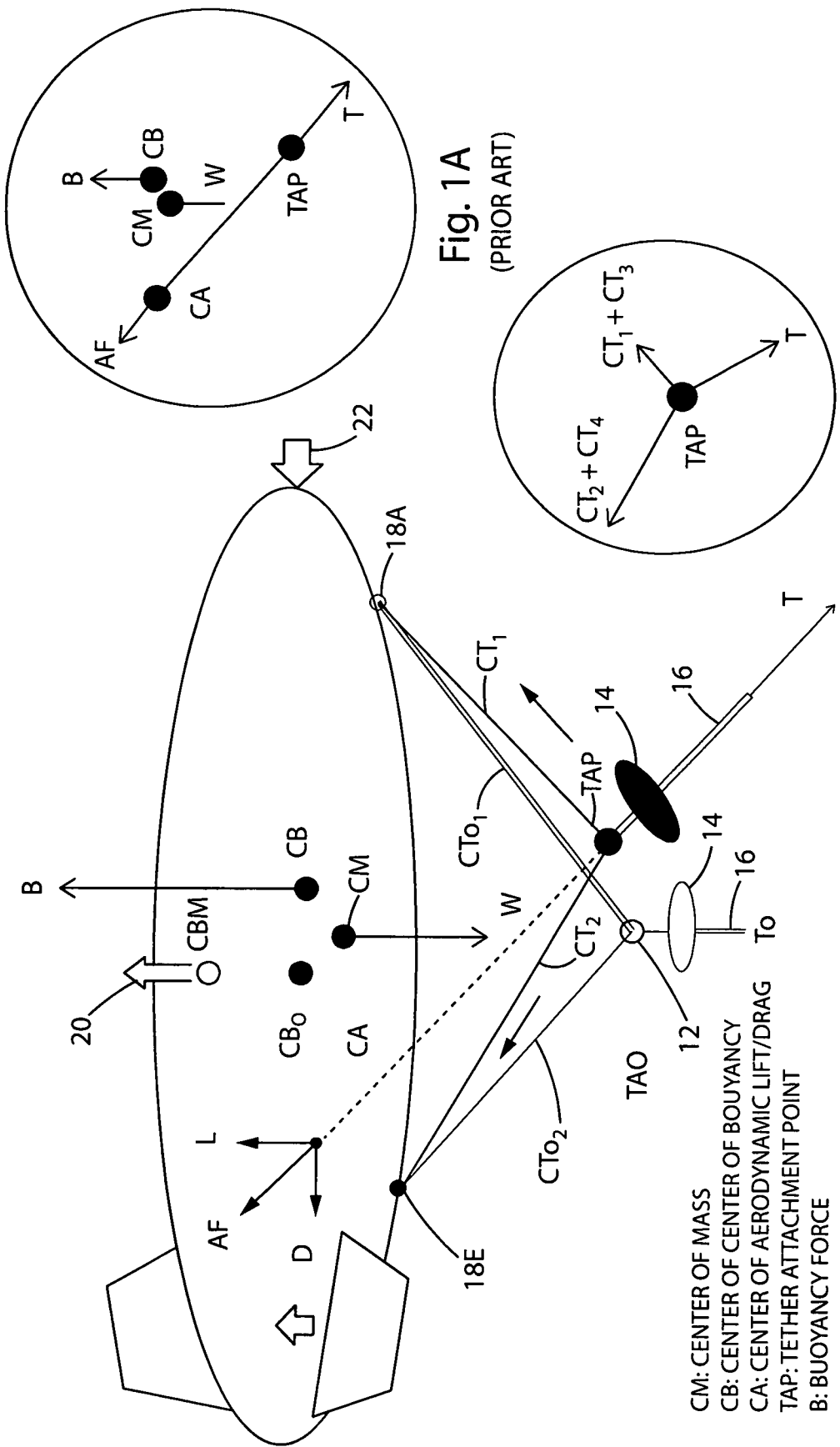
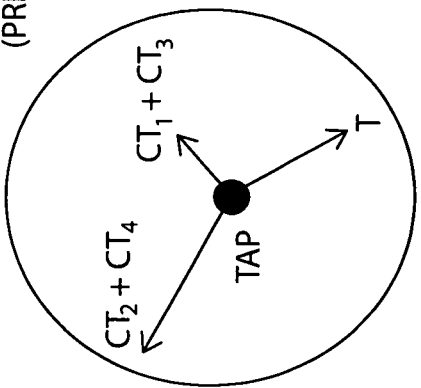
Fig. 1A (PRIOR ART)
Fig. 1B (PRIOR ART)
Fig. 1 (PRIOR ART)
CM: CENTER OF MASS
CB: CENTER OF CENTER OF BOUYANCY
CA: CENTER OF AERODYNAMIC LIFT/DRAG
TAP: TETHER ATTACHMENT POINT
B: BUOYANCY FORCE
W: NET WEIGHT EXCLUDING THAT OF TETHER
T: TENSION FORCE ON TETHER
L: AERODYNAMIC LIFT
D: DRAGH

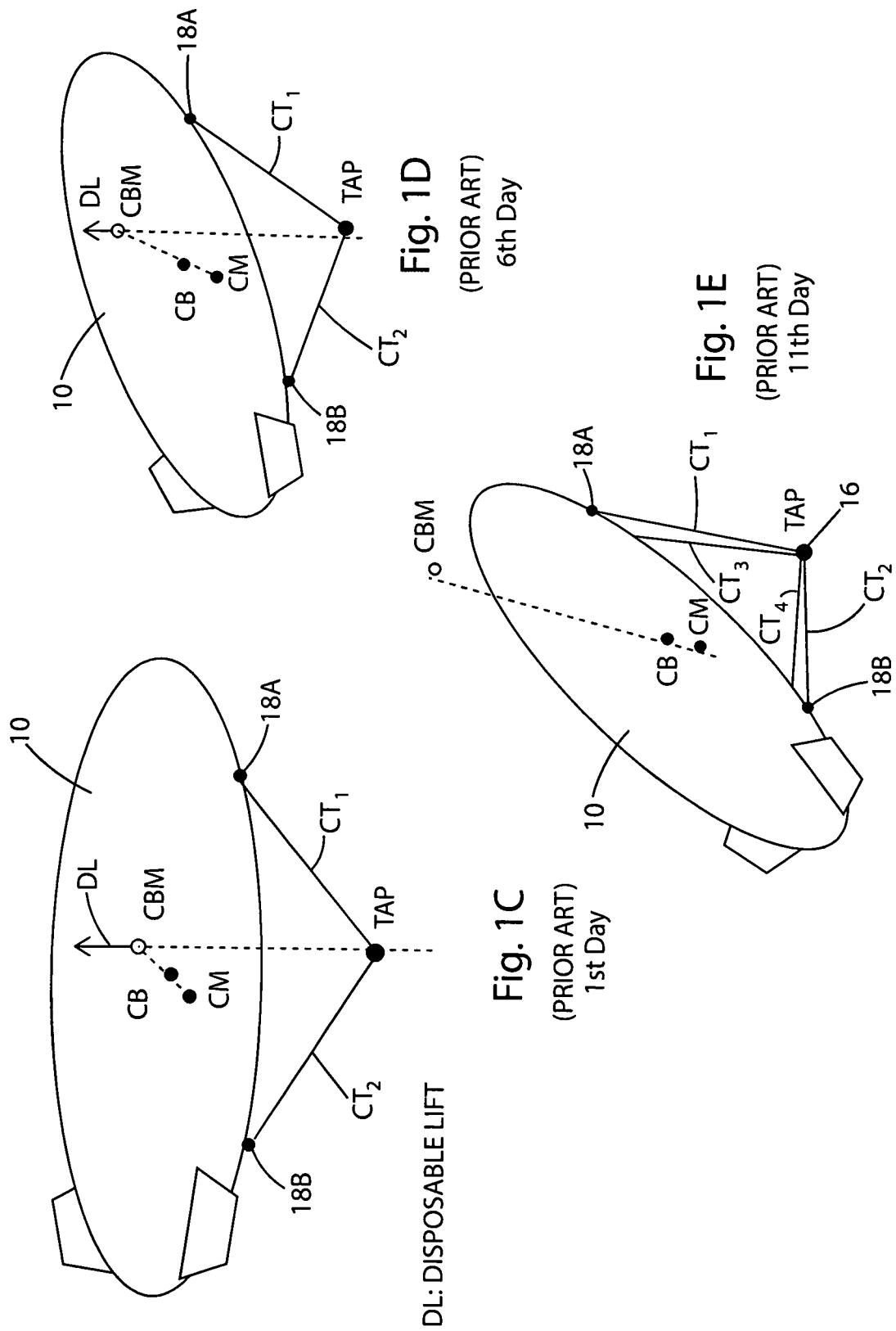

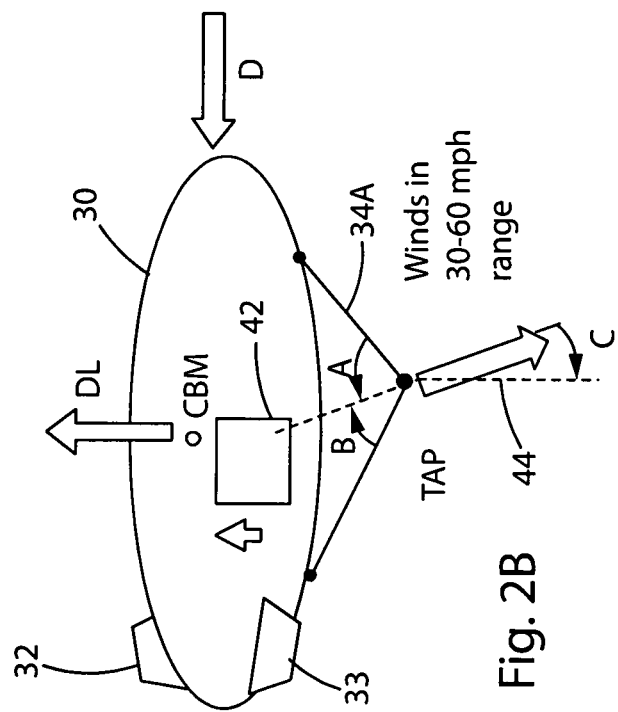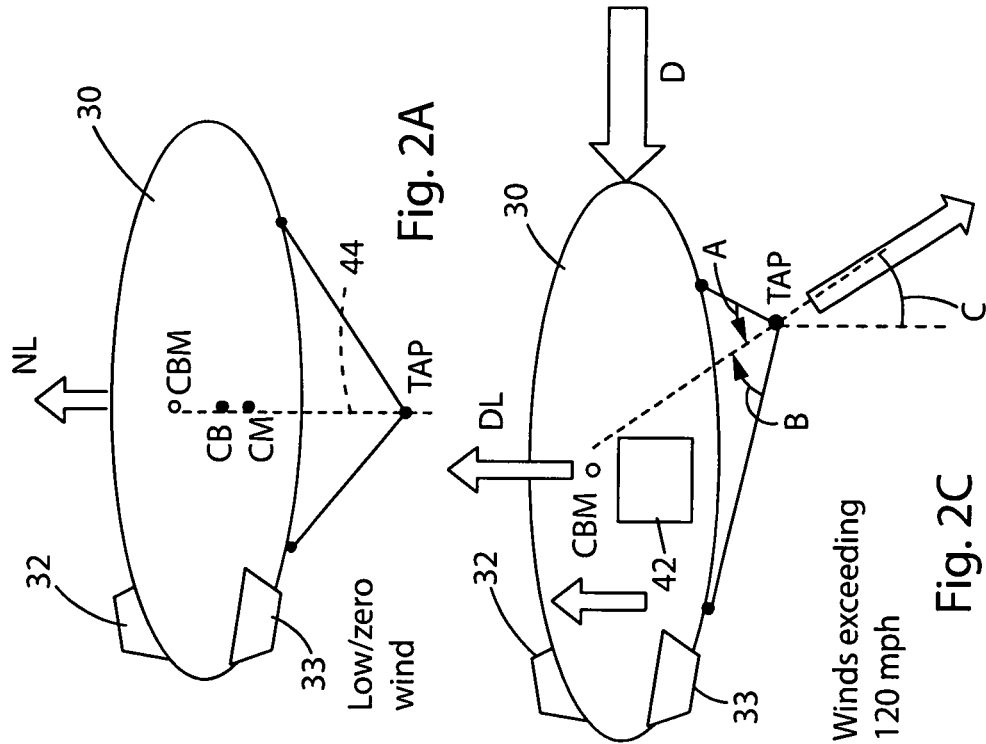
Fig. 2

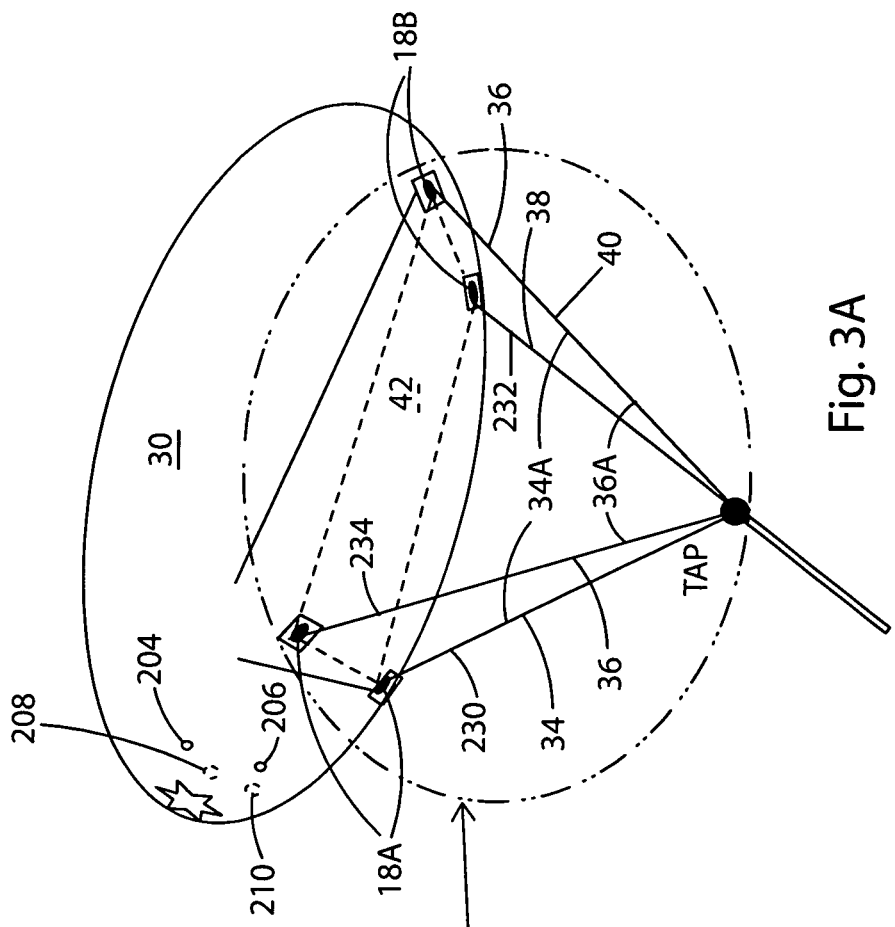
Fig. 3A
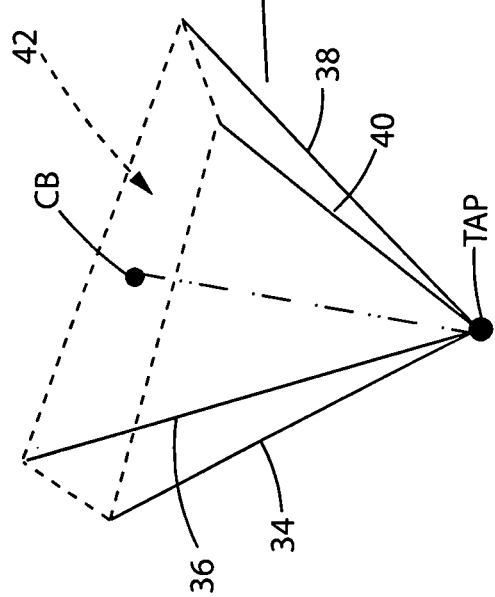
Fig. 3B
Fig. 3

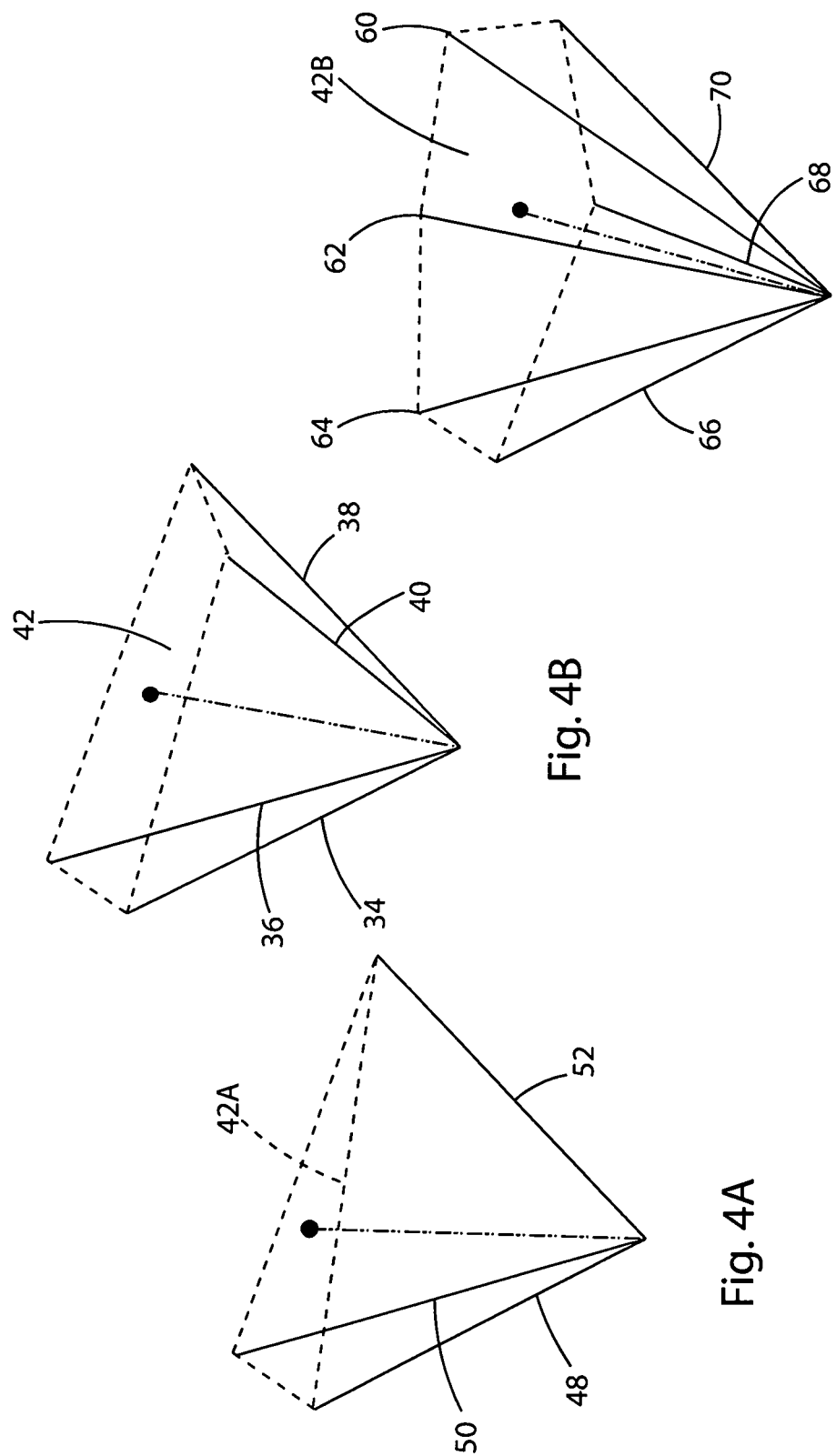

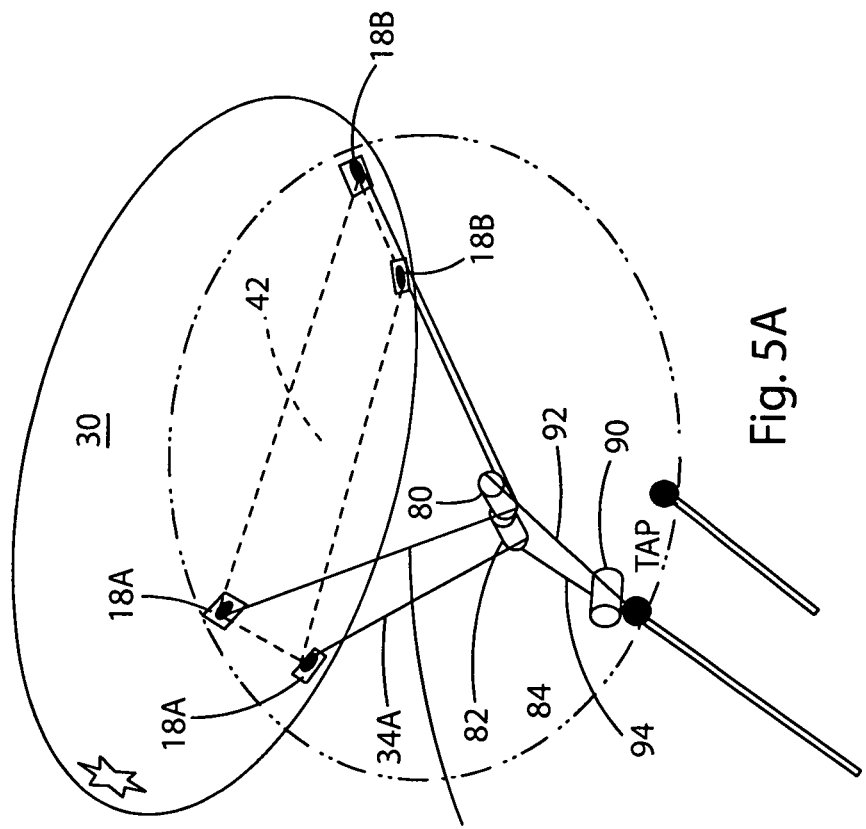
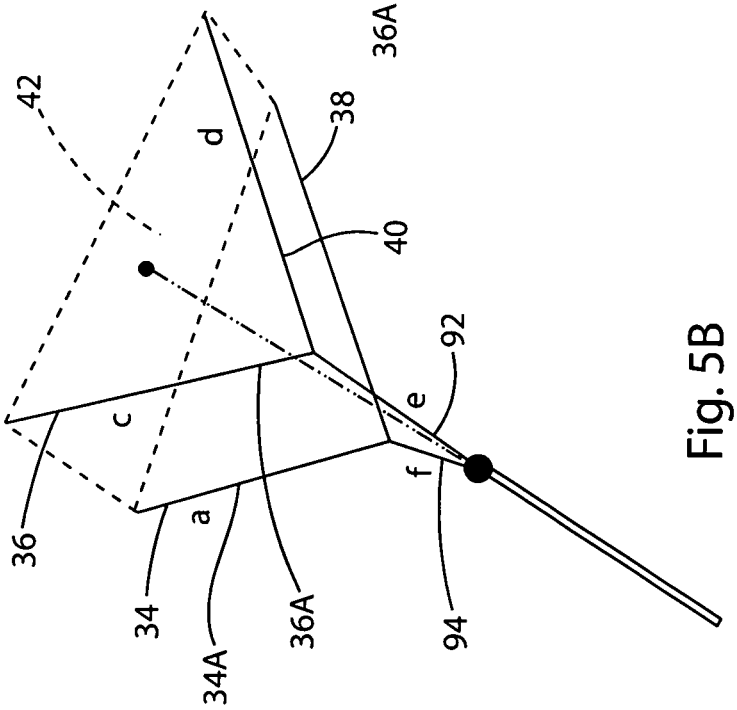
Fig. 5A
Fig. 5B
Fig. 5

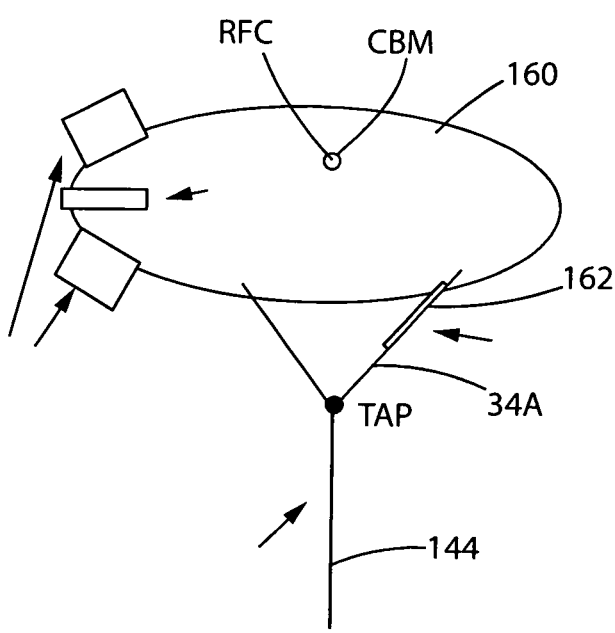
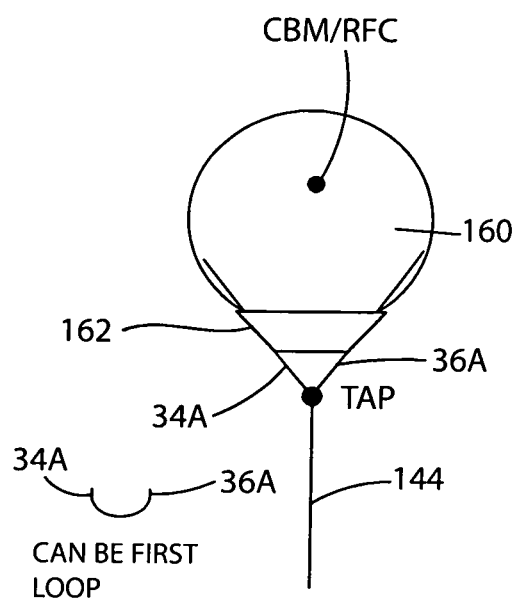
Fig. 15A
Fig. 15B
Fig. 15
FOR NO WINDS, THE FORCE CENTER *CF* AND *CBM* COINCIDE

FOR STRONGER WINDS, THE FORCE CENTER *CF* AND *CBM* NO LONGER COINCIDE

Suspension Management System

Fig. 20    Bridle tension control flowchart

Fig. 21 Aerostat attitude data acquisition and processing

Cascade (master/slave) control architecture for Aerostat Stability Management Process view

ADAPTIVE HARNESS TO STABILIZE AIRSHIPS IN HIGH WINDS AND METHOD

CROSS REFERENCE TO RELATED APPLICATIONS

The subject matter of this utility application is related to a design patent application titled Airship Canard which is being filed concurrently herewith.

STATEMENT REGARDING FEDERALLY SPONSORED RESEARCH OR DEVELOPMENT

Not applicable.

INCORPORATION BY REFERENCE OF MATERIAL SUBMITTED ON COMPACT DISC

Not applicable.

REFERENCE TO A "MICROFICHE APPENDIX"

Not applicable.

BACKGROUND OF THE INVENTION

1. Field of the Invention

The invention pertains to a dynamic adaptive harness to stabilize airships and particularly novel tethered aerostats by controlling pitch within a stability zone geometric suspension control system. More particularly the invention relates to the application of an adaptive adjustable cable harness with a pitch control cable winch and/or a canard connected to the aerostat and pitch control cables alone or together with a lift gas replenishment system and particularly an earth based lift gas replenishment system to provide a dynamic adaptability to high wind conditions for long term deployment.

2. Description of Related Art Including Information Disclosed Under 37 C.F.R. 1.97 and 1.98.

The prior art includes a wide variety of control systems for airships and tethered aerostats. Airships generally are distinguishable from aerostats in that aerostats are tethered while airships are not tethered. Airships and aerostats however share similar problems such as weight restrictions, lift gas depletion and contamination and control in high wind conditions. Typically the more sophisticated the control system the greater the weight penalty at the expense of payload and duration of deployment. Moreover prior art systems are wasteful of lift gas which may be helium, hydrogen, methane or mixtures thereof by having to vent lift gas when the airship is taken down. Moreover carrying lift gas containers, blowers, compressors, heaters or other on board devices adds weight at the expense of payload and the duration of airship or aerostat deployment.

As used herein the word "airship" is used generically to include all lighter-than-air vehicles in which lift is primarily achieved with a lift gas. The term "aerostat" is used to more particularly refer to blimps and more precisely to tethered airships or tethered unmanned aerial vehicles that present their own unique flight characteristics. Nevertheless various aspects of the invention relating to shifting the center of lift (CL), and the center of gravity (CG) by controlling cable or harness length and/or tension to change pitch in response to high winds can be applied to all types of airships. Yaw, roll and particularly pitch are applicable to all types of airships. In addition in high winds pitch control is particularly important in relation to internal pressure to prevent the wind from deforming the skin and form flat spots that further exacerbate pitch, yaw and roll characteristics that in tethered airships can result in tearing away of the harness from the airship.

Referring now to prior art FIGS. 1, 1A, 1B, 1C, 1D and 1E a prior art tethered aerostat 10 is illustrated having a conventional tether attachment point (TAP) 12 which is connected to the ground through a slip ring 14 to tether 16 to the ground. The TAP in prior art aerostat is created by splicing 4 separate cables $CT_1$, $CT_2$, $CT_3$ and $CT_4$ with tether 16 (FIG. 1E). The prior art separate cables are not looped or form a loop until a fixed loop is formed having a TAP at or near the center.

The tether attachment point $TAP_0$ is where the two forward cables $CT_1$ and $CT_3$ and the two rear cables $CT_2$ and $CT_4$ connect to aerostat 10. Each of the two forward cables $CT_1$ and $CT_3$ are connected to aerostat 10 by two forward attachment patches 18A and the two rear cables $CT_2$ and $CT_4$ are connected to aerostat 10 by two rear attachment patches 18B. Under no wind conditions the length and tension on the two forward cables $CT_{01}$ and the rearward cables $CT_{02}$ with respect to the $TAP_0$ are substantially the same and the center of buoyancy mass (CBM) represented by arrow 20 is over the $TAP_0$ and the aerostat is stable.

The presence of a wind represented by arrow 22 shifts the $TAP_0$ to $TAP_1$ so that $TAP_1$ is no longer in alignment with the CBM which changes the tension on front cables $CT_{01}$ to $CT_1$ and the tension on the rear cables to $CT_2$. The length of the two forward cables $CT_1$ and $CT_2$ remain the same with respect to the aerostat 10 but tension on the forward cables $CT_1$ and $CT_3$ has decreased and tension on the rearward cables $CT_2$ and $CT_4$ has increased as shown by FIG. 1A and the free body diagram 1B.

Increasing the strength of the wind continues to exert further tension on $CT_2$ and $CT_4$ ease tension on $CT_1$ and $CT_3$ until $C_1$ and $CT_3$ become slack and all tension is borne by $CT_2$ and $CT_4$. At that point a failure can occur in one of the two rear attachment points 18B or a gust of wind can suddenly result in the failure of one or both of the two rear attachment patches 18B.

The horizontal position of CBM also depends on the value of the disposable lift DL. The force of gravity on aerostat 10 represented by W and the buoyancy force B is combined to provide the force center CBM. The center of W and B or the resultant force which is B=W=DL or disposable lift with a resultant force DL. Therefore as helium or lift gas is depleted due to leakage during diurnal heating cooling, osmosis loss or contamination with the atmosphere through the airship skin DL moves CBM further and further to the front as illustrated by comparing first day FIG. 1C with $6^{th}$ day FIG. 1D to $11^{th}$ day FIG. 1E. CBM must lie directly on top of the tether attachment point TAP to maintain static balance for level flight. The gradual and constant reduction in the volume and purity of on board helium results in the constant shift of the CBM forward. This shift constantly moves the bottom of the airship upward that increases the angle of attack or pitch until the belly is dangerously exposed and DL is drastically decreased so that even a small change in the wind can rip the cable $CT_1$ or $CT_3$ from one or both the forward attachment points 18A.

The rigidity and shape of the airship also imposes a profound influence on its flight characteristics as well as its adaptability to accommodate heavy flight modifying equipment such as motors and winches. For example most aerostats unlike dirigibles do not have internal spars needed to support heavy motors and winches. Placing a heavy motor or winch inside an aerostat envelope to operate an external control cable could result in the motor and winch being pulled through the soft skin of the envelope. Solving this problem by adding spars and internal structure like a dirigible adds weight at the expense of altitude and mission duration.

The traditional elliptical or cigar shaped airship have been preferred over the years since this shape unlike other airship shapes generates lift in wind. One one of the biggest problems is induced drag because the effective aspect of the blimp is less than 1 while a well designed airfoil typically has an aspect ratio of 4 or more. Induced drag is roughly inversely proportional to the aspect ratio resulting in the lift to drag ratio suffering when the aerodynamic lift of the blimp body combats high winds.

As used herein light winds are 20 miles per hour or less, moderate winds are 20 to 40 miles per hour and heavy winds are 90 miles per hour and over. Typically the term high wind is also a function of airship size. Prior art airships, referenced below have the following stated wind speed capabilities:

| Airship Length | Operational Wind Speed | Survival Wind Speed |
| --- | --- | --- |
| 39' | 46 mph | 63 mph |
| 71' | 57 mph | 80 mph |
| 91' | 57 mph | 80 mph |
| 230' | 80 mph | 103 mph |
| 240' | 80 mph | 115 mph |

The invention increases both the operational and survival windspeed by about 50 to 80% thereby reducing the size of the aerostat and the amount of lift gas required while extending the duration of the flight mission.

Mears U.S. Pat. No. 8,167,246 describes a tethered ellipsoid aerostat with an inflatable airfoil that is described as being able to accommodate winds of up to 80 mph. The tethered ellipsoid aerostat of Mears like the tethered ellipsoid aerostat of Allsopp U.S. Pat. No. 6,016,998 are not elliptical or have a typical cigar shape and as such would not weathervane with their nose pointing into the wind as they have no nose. As a result all surfaces at the largest diameter of the ellipsoid must be reinforced or pressurized to withstand cavitation or wind deformation which adds weight at the expense of payload. In addition the kite like appendage is downwind of the front of the airship and does not operate as a canard disposed in the front of the airship to vary the length of the harness or change the pitch of the tethered airship by moving the CBM to the rear to control pitch of the tethered aerostat.

A number of prior art tethered airships have multiple tethers that attach tether attachment points of the aerostat directly to the ground and as such do not have a harness or bridle disposed between the aerostat and a single tether. Examples of aerostats having multiple tethers connecting the aerostat to the ground include prior art such as Glass et al. U.S. Pat. Nos. 9,789,947, 9,000,605, Vermillion, et al. U.S. Pat. No. 9,187,165 and Rozov Russian Patent 2 305 647. Adjusting a plurality of tethers from the ground presents many problems. One of the problems is the entanglement of the tethers during the twisting and turning of the airship at altitude. Another significant problem is the inherent delay in responding to the yaw and pitch attitude of the airship aloft while analyzing and providing a response time from the ground. The additional tethers also add weight at the expense of payload and the requirement to have redundant systems disposed on the ground needed to process. A typical tether weighs about 1,000 pounds at 5,000 feet and 2,000 pounds at 10,000 feet therefore even two tethers with all other things being equal cuts the deployment altitude in half. In addition the shorter the distance from the tether attachment point is to the center of mass of the aerostat the more stable the aerostat and the easier it is to control the aerostat from the TAP.

Examples also exist of airship pitch control by varying the length and tension of harness cables by employing a winch to simultaneously wind one end of the cable while unwinding the other end of the cable to change pitch for anchoring the aerostat to the ground. One such system is shown in FIG. 12 and described in Verci, et al. U.S. Publication 2012/0181381. However this is a launch and recovery system in which a change of pitch of the airship occurs during launch and recovery using manned operation on the ground while the attitude of the airship is observed on the ground during launch and recovery operations. Changing the pitch of an airship in the prior art is best accomplished on the ground under observation since manned control and observation on the ground is necessary to prevent cable airship attach points from being pulled off the airship during changes in pitch. As such observed and manned ground operations are different from unmanned and unobserved in flight operations. Moreover ground operations do not include a stability zone suspension control or a cascade control system that provides dynamic control of roll, yaw and particularly pitch in real time environmental flight conditions to impart stability of the aerostat in a variety of wind conditions and extend flight duration and wind adaptability.

Also particularly relevant to the invention are the connection patches on the airship in relation to the harness cables and single tether. In accordance with the invention a single tether is connected through a slip ring to a single winch to control both the length and tension of the harness between the winch and cables of the harness by a cascade control system or a canard to control the pitch axis. In the preferred embodiment of the invention the tether includes a hollow feed tube for supplying a lift gas to the aerostat as disclosed in my previous inventions for which U.S. Pat. Nos. 7,708,222, 8,083,174 and 8,485,465 were issued. Rabbino U.S. Pat. No. 9,321,518 in FIG. 6 shows a related type of adjustable harness in which two separate motors are disposed on the airship each of which have pulleys connected to a tether at a fixed and stationary point. This arrangement like the arrangement in Palmer, et al. U.S. Pat. No. 10,065,738 adds weight for required support structure and the complexity of two separate motors to control cable tension and length. Palmer controls the roll axis using two separate motors while Rabbino controls the pitch axis using two separate motors. As previously discussed placing winches and motors inside an aerostat requires spars, ribs or stringers to support the motors and winches which adds weight to the aerostat which sacrifices payload and deployment duration and requires significant modification to the interior of the aerostat to prevent the motor and winch from being pulled through the skin of the aerostat. In addition both the Rabbino and Palmer prior art have a stationary connection between the tether and the airship harness while the invention provides a dynamic adaptable connection between the tether and the harness and accommodates a lifting gas feed tube to further enhance long duration deployment.

Raytheon International Publication Number WO 2017/095505 describes an aerostat with an integrated hydrogen or lift gas feed tube connected to the ground like my aforementioned U.S. Pat. Nos. 7,708,222, 8,083,174 and 8,485,465. The Raytheon prior art includes a tether which includes a stationary bifurcation or confluence point at which the tether branches into a plurality of smaller lines that are attached to the aerostat to distribute tensile load across several attachment points on the outer skin. An adjustment motor or winch is not provided at the bifurcation or confluence point and Raytheon does not provide a pitch control in combination with a lift gas feed tube.

Korean patent application KR 20090069084 provides a single tether connected to a bifurcation or confluence point which provides for an adjustment at or near the confluence point to adjust the tension on each cable to provide a balanced tension on the cables. The invention does not balance tension but instead redistributes tension and cable length based on moving the TAP with respect to the CBM. Tension redistributed by the computer and/or the cascade control of the invention in response to changes in the environment of the aerostat does not balance tension on each of the cables. The tension on the front cables increases as the cable is wound around the winch to pull the nose down while the tension on the rear cable is simultaneously decreased as it is unwound from the winch.

In some embodiments of the invention moveable control surfaces can be used to supplement the control of roll and yaw. Airships are generally more stable in the roll and yaw axis than in the pitch axis. Many tethered aerostats do not have active control surfaces as they weathervane into the wind. Active control surfaces add weight for motors to operate moveable tail surfaces. In large aerostats moveable control surfaces can be added. Moveable tailplane parts for aerostats are described in Vercesi, et al. WO 2011012996. Not shown in the prior art is a nose canard attached to the nosecone or appended from adjustable pitch control cables to impart an immediate pitch adjustment. The nose canard embodiment of the invention is disposed in front of the airship and like the winch and the active adaptive devices provides a passive adaptive devices to adjust the length and change the tension of the cables to maintain them in stability zone by an adaptive geometric suspension control.

SUMMARY OF THE INVENTION

The novel system and method of the invention provides an effective means to increase the ability of airships and particularly tethered aerostats to withstand high wind speeds and increase in flight duration. The two most critical factors in flight duration for airships and tethered aerostats are unpredictable variations in wind speed and depletion of lift gas.

Variations in wind speed velocity and direction present many problems to airships and particularly tethered aerostats at altitude. Airships and particularly tethered aerostats having a typical elliptical cigar shape typically weathervane into the wind. Tethered aerostats that typically weathervane into the wind also change pitch with a decrease in altitude due to an increase in tether curvature. The curves in the tether as well as the angle of the tether attachment point (TAP) to the cables of the harness also change. Airships and tethered aerostats have a center of buoyancy (CB) and a center of mass (CM) which by virtue of gravity results is a force center CBM which is colinear with CB and CM. CBM can be further combined with dynamic forces such as lift and drag forces to define an instantaneous center of force moment, or resultant force center RCF. Unlike CBM which is fixed to the body of the aerostat and remains unchanged as long as the disposable lift stays constant, CF, just like instant center of rotation, is only defined at that particular instant. Fortunately, CF coincides with CBM under no wind condition or when dynamic forces are small, and only deviate significantly from CBM when wind speeds exceed about 100 mph.

The force center (CBM) or center of mass and buoyancy must stay in line with the TAP to maintain a level pitch or within a geometrical polygon defined by the number of support cables to maintain survivability. As wind speed increases the dynamic adaptive harness changes the tether inclination angle A, the angle between the front cable $T_1$ and the tether T and the angle B between the rear cable $T_2$ and the tether T to accommodate wind velocity and maintain a level pitch by maintaining but redistributing forces on the cables of the harness. At this point it should be noted that CBM is the combined force center for buoyancy B and weight M. In winds less than 100 mph the resultant force center or RFC is not much different from CBM. As used herein CBM and the more precise RFC are used as references to maintain the TAP within the geometric stability zone defined by the number of cables making up the aerostat harness. The tether attachment angles heretofore discussed are determined by the arc tangent ratio between net drag D and net lift NL (which includes disposable lift and aerodynamic lift or the total buoyancy lift, aerodynamic lift minus the net weight of the aerostat (excluding tether weight in accordance with the following equations:

$$C = \tan^{-1}(D/NL) \qquad \text{equation 1}$$

$$T_1 = T \cdot \sin B / \sin(A+B) \qquad \text{equation 2}$$

$$T_2 = T \cdot \sin A / \sin(A+B) \qquad \text{equation 3}$$

Where $A$=angle between front cable $T1$ and the tether $T$;

$B$=angle between rear cable $T2$ and the tether $T$; and $C$=the tether inclination angle.

Equation 1 provides the math for the tether angle. When there is no wind D=0 and the tether is substantially vertical. As soon as there is wind drag D increases the tether does not remain substantially vertical since the horizontal component of the tether tension force must counteract drag. Equations 2 and 3 show how the tensions on the cables $T_1$ and $T_2$ change.

The invention keeps TAP at or near the center line of the CBM or more accurately RFC and within a stability zone with a geometric suspension control system by changing the tension and length of the harness cables in relation to the TAP. A change in the length and tension of the cable in relation to the TAP can be achieved in an active mode or in a passive mode or a combination of both. In the active mode one or more motorized winches are employed to move the TAP toward the nose of the aerostat to reduce the pitch altitude of aerostat and keep the TAP in substantial alignment with the CBM/RFC in the stability zone in the geometric suspension control system. In the passive mode a canard is disposed on the front of the airship or between the front cables of the airship to use the wind to increase the tension on the front cables by moving the front cables and canard upwardly toward the bottom of the aerostat and keep the angle of the TAP in alignment with the CBM/RFC. The active and passive modes may be used separately or used together especially where weight is not a limiting factor. The use of either the active mode or system alone or together with the passive mode or system is advantageously applied to new aerostats or retrofitted to existing aerostats as it in the preferred embodiment changes only the architecture of the cables and not the construction of the aerostat.

The invention in contrast to the prior art creates one or more control loops by either using a single cable and having both ends attached to create an aerostat in accordance with the invention or retrofitting an existing aerostat by taking the individual cables and splicing the ends together to create a special control loop cable. This control loop cable can extend laterally from about the nose of the airship to about the tail of the aerostat or from about one side of the nose to the other side of the nose of the aerostat. Where the loop extends transversely with respect to the nose it can be attached to a third cable running to the rear of the aerostat and the two front cables be used as an attachment point for a passive adaptive device such as a canard.

Where the control loop cables run laterally they can be used along with an active adaptive device such as a winch controlled by a computer to adjust the respective length and tension to control pitch, yaw and roll of the aerostat. The active adaptive device and passive adaptive devices can be used alone or combined with other active control devices such as moveable rudders and elevators on the aerostat.

The method of the invention provides for the identification of a stability zone geometric suspension control system. The identification of the stability zone control is based on the number of cables in the harness and their geometric relation to the TAP to provide a dynamic adaptive harness to stabilize an airship and particularly a tethered aerostat in high winds. As used herein the term light winds means winds of from 0 to 20 mph. The term moderate winds mean from 20 to 60 mph and the term high winds mean winds above 60 mph.

The invention is particularly applicable to aerostats and provides for maintaining a stability zone defined by a polygon the shape of which is dependent upon the number of cables connected to the tether at the TAP. Once the stability zone is determined one or more winch motors are provided to control the length and tension of the three or more cables forming the stability zone of the polygon with the least number of sides. The one or more motors that keep the TAP in alignment with the CBM in the stability zone polygon are controlled by a harness or bridle computer that receives data from one or more anemometers and one or more accelerometers. Optionally telemetry and GPS receivers, attitude and rate of change estimation (fuzzy logic) devices and/or a cascade, control system are used to provide control data to stabilize the aerostat in high winds. Further extremely high wind conditions can be accommodated by in addition to making changes in the harness also making changes to the architecture of the aerostat or airship by adding or using moveable control surfaces such as an elevator fin, rudder, rudder actuation and canard position devices to provide additional response components to provide further control of an airship or tethered aerostat.

The advantages of the invention are further enhanced with a cascade control system to make changes in the position of the TAP with respect to the CBM/RFC to keep the TAP within the stability zone suspension geometry. Keeping the TAP within the stability zone suspension geometry in a tethered aerostat is inherently a slow process. Rapidly moving weather fronts, high winds and gale force winds demand a nearly instantaneous reaction to prevent the aerostat from receiving a quick jolt that would otherwise rapidly move TAP harshly backwards. A conventional control system in a long duration deployment would soon be overwhelmed in making the high torque instantaneous corrections required in such an environment particularly when an electrical signal is sent down the tether and changes happened before a corrective signal can be sent back up the tether to command the winch. To prevent such a lag a cascade control system or a fuzzy logic is advantageously added to insure the winch and control of the TAP within the stability zone geometric suspension are adapted in a substantially instantaneous time frame. To assist in such a response the passive canard at the front of the airship be utilized alone or in combination with the dynamic adaptive harness and the cascade control system.

The onboard cascade control system or a fuzzy logic system solves the problem of rapidly moving weather fronts and high winds by utilizing an inner control or "slave" control that uses filtered tension data which eliminates much of the transient effects of the outer control. The inner control is still based on conventional attitude telemetry in real time but since the outer loop control ensures that the suspension geometry is changed to a far more favorable environment for the operation of the traditional attitude control The on board cascade control system or a fuzzy logic system allows the system to get the data to anticipate corrections even before they are required. The heavy processing computers can stay on the ground analyzing data while lightweight more agile computers can be deployed aboard the aerostat to quickly respond to rapid changing conditions as provided by on board sensors such as anemometers, barometers, temperature and accelerometers. For example a falling barometer, rapid temperature change and other real time environmental data can be used in a fuzzy logic or cascade type system to anticipate rapidly changing weather conditions.

Since dependent upon temperature pressure altitude and diurnal changes a tethered aerostat can lose 1% of its lift gas per day it can take 10 days or sooner for the net lift to drop below 90% of its peak capacity. The loss of lift is in part due to diurnal heating and cooling wind and atmospheric conditions and even with some of the most advanced airship skin it doesn't take long for disposable lift to drop to unacceptably low conditions even without the effect of winds on the duration of deployment.

Once the peak capacity of helium falls below 75% the effects of temperature, outside barometric pressure becomes even more critical. An aerostat surviving a cold night and having a thick cloud cover encountering a cold icy blast of air likely could have its internal pressure so depleted that the icy wind would dimple the skin and result in a violent upward, downward or yaw or pitch to rapidly exceed the harness patch tensile strength and loss of the aerostat. A ground based lift gas replenishment system together with a heater together with the dynamic adaptive harness counteracts both the unpredictable nature of winds as well as maintaining the lift gas at its peak capacity to extend flight mission duration by ameliorating the effects of temperature, pressure, winds and diurnal heating and cooling.

As previously noted both wind and lift gas depletion limit the duration of deployment particularly with tethered aerostats. In a further embodiment of the invention the deployment duration is further extended by connecting a ground based lift gas system for helium, hydrogen or other lift gas replenishment system to the airship with a dynamic adaptive harness. The ground based lift gas or helium replenishment system includes lift gas, helium or hydrogen scrubbers and purifiers with a tether that includes electrical communication, fiber optic or other cables within the tether to communicate with light weight systems aboard the airship or tethered aerostat while all the heavy equipment such as lift gas replenishment tanks, lift gas scrubbers remain ground based. In a further embodiment of the invention place all heavy components on the ground such as lift gas heaters to maximize the advantages in long duration flight missions. As used herein the terms long duration flight missions mean flight duration missions of 30 days and much longer when helium replenishment is added making duration limited only by extreme weather conditions such as hurricanes and tornadoes and the service life of the airship skin in sun.

As used herein the term "lift gas" means any gas lighter-than-air that is used for operating a lighter-than-air aircraft aloft such as an airship or aerostat. The term "lift gas" therefore includes hydrogen, helium and methane and mixtures thereof. The ground based lift gas or helium replenishment systems includes a heater so that warm lift gas can be sent up the tether with the hollow feed tube and spent or contaminated hydrogen can be purified and returned to the aerostat through the hollow feed tube in the tether. The feed tube is also useful in retrieving the aerostat so that lift gas such as helium does not have to be vented. Instead it is returned to the ground based replenishment system through the tether with the hollow feed tube.

It is therefore an object to provide an adaptive harness system to vary the length and tension on airship and aerostat cables connected to the airship.

It is therefore an object to primarily control the pitch axis with an adaptive harness system to maintain the CBM or resultant force center RFC in line with the TAP by moving the TAP forward in response to increasing wind velocity.

It is therefore an object to maintain the CBM/RFC in line with a TAP in a tethered aerostat.

It is therefore an object to determine a polygonal stability zone geometric suspension control for tethered aerostats.

It is therefore an object to maintain and/or make corrections to keep the TAP and CMB/RFC in alignment or at least in a geometric stability suspension zone by moving the TAP toward the nose or away from the nose in tethered aerostats in tethered aerostats in response to variations in wind speed.

It is therefore an object to move the TAP toward the nose or away from the nose in tethered aerostats by moving the cables of the harness with an active adaptive device or a passive adaptive device or both.

It is therefore an object to provide an active adaptive device controlled by a computer to move the system TAP toward the nose or away from the nose with a motorized pulley that simultaneously shortens the TAP with respect to the nose of the airship while lengthening the TAP with respect to the tail of the tethered aerostat.

It is therefore an object to provide a passive system to move the TAP toward the nose with a passive activated canard alone or in combination with an active system.

It is therefore an object to provide a real time adaptive harness with a fuzzy logic or cascade control system to operate the dynamic adaptive harness.

It is therefore an object to heat replenish lift gas on the ground and supply heated replenished lift gas to the deployed aerostat to extend flight duration.

It is therefore an object to save helium by returning excess helium to the helium replenishment tank on the ground instead of venting helium during recovery.

It is therefore an object of the invention to use the weight of the tether to maneuver a tethered aerostat.

It is therefore an object to construct new airships and aerostats having moveable control surfaces to further enhance high wind controllability in combination with the active and passive adaptive devices.

It is therefore an object of the invention to provide a dynamic adaptive harness to extend flight missions and stabilize airships and aerostats in high winds and control pitch yaw and roll axis to fly an aerostat like an airplane in response to changes in environmental conditions.

It is therefore an object to have the ability to quickly upgrade and retrofit existing airships with the dynamic adaptive harness by providing a modification by only changing the harness outside the aerostat.

These objects and other objects and advantages will become ore fully appreciated from the brief description of the drawings, detailed description and claims so as to allow the selection of various objects in the implementation of the invention which should be considered as being within the scope of the claims.

BRIEF DESCRIPTION OF THE DRAWINGS

With the foregoing objects and related description in view the invention and its advantages will be more fully appreciated when read in conjunction with the following drawings in which:

FIGS. 1, 1A, 1B, 1C, 1D and 1E are prior art side views of a tethered aerostat with a conventional cable tether attachment point TAP under various environmental conditions;

FIG. 2 collectively consists of FIGS. 2A, 2B and 2C which include a winch controlled TAP to the adaptive harness of the invention;

FIG. 3 collectively consists of 3A and 3B which represent a geometric stability zone control system for a four cable harness in accordance with the invention;

FIG. 4 collectively consists of FIGS. 4A, 4B and 4C which illustrates a geometric polygonal stability zone for a three cable, four cable and six cable harness in accordance with the invention;

FIG. 5 collectively consists of FIGS. 5A and 5B which illustrates a further adaptive harness for controlling three flight axis of pitch yaw and roll for a tethered aerostat in accordance with the invention;

FIG. 15 collectively consists of FIGS. 15A and 15B and includes in FIG. 15A a side view of a further embodiment of a passive adaptive control device and 15B is a front view of FIG. 15A illustrating the novel adaptive harness in light wind or no wind to increase the flight duration of a tethered aerostat;

DETAILED DESCRIPTION OF THE INVENTION

Figure 6:
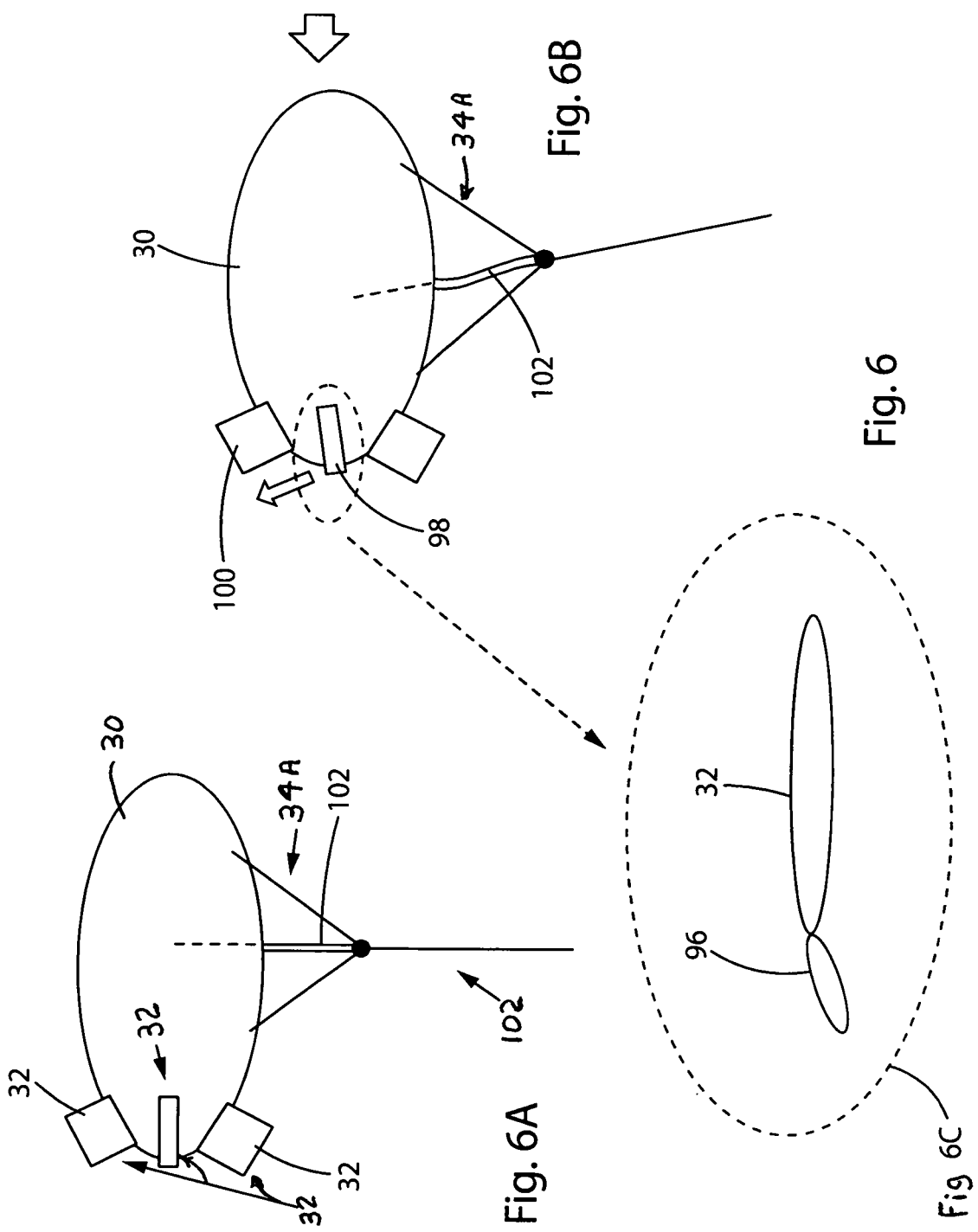
FIG. 6 collectively consists of FIGS. 6A, 6B and 6C which includes a further embodiment of the adaptive harness on an aerostat with a lift gas replenishment feed tube and moveable control surfaces.

The pitch axis of an airship and particularly for a tethered aerostat is the flight axis that is most important to control disposable lift. The yaw axis is generally less important as the yaw axis is provided for by the weathervaning of the traditional elliptical shaped airship into the wind. The roll axis while more important than the yaw axis is a function of updrafts and downdrafts during diurnal heating and cooling and generally presents less of a problem except in thunderstorms.

The novel adaptive harness when adapted to existing tethered aerostats without active control surfaces (i.e. rudders and elevators) effectively controls pitch and yaw without changing the architecture of the aerostat. All changes needed to control pitch and yaw to accommodate high winds are made to the harness. Roll axis can also be controlled depending on weight and payload consideration.

In more sophisticated applications the novel adaptive harness can be used to further extend the duration of deployment of an existing aerostat by adding a lift gas replenishment tube. In even more sophisticated long duration high wind applications moveable rudders and elevators are added to the tethered aerostat to further control the pitch and yaw axis with the moveable surfaces to provide coordinated flight such as achieved with untethered airships and aircraft while the tethered aerostat remains tethered with the novel adaptable harness. As will be recognized by those skilled in the art coordinated flight requires maintaining altitude while controlling both the pitch and roll axis to prevent loss of disposable lift. Coordinated flight control can be obtained in tethered aerostats with the adaptive harness by keeping the TAP within the geometric stability zone.

Referring now to FIG. 2A a tethered aerostat 30 with fixed rear fins 32 is illustrated in which arrow NL represents net lift which is equal to disposable lift and aerodynamic lift from the aerostat which is mostly from the fixed stabilizer 33 in no wind conditions. The CBM is over the TAP in FIG. 2A and the airship is in a stable deployment condition with a level pitch. The aerostat 30 in FIG. 2A is supported by two forward cables 34 and 36 and two rear cables 38 and 40 as schematically illustrated in FIG. 3A. The invention modifies existing prior art aerostats by splicing cables 34 and 40 together to make a single control loop 34A and cables 36 and 38 are spliced together to make a second single control loop 36A. In aerostats constructed in accordance with the invention both single control loop 34A and single control loop 36A are formed by having a single cable connect each 18A patch with an 18B patch to create two separate control loops.

The confluence of the four cables in a prior art statement forms a geometrical rectangular polygon 42 FIGS. 2B, 2C, 3A and 3B defining a stability zone geometric suspension control system. While the invention could be implemented with four separate cables it is implemented with a single cable 34A in which 34 refers merely to the front portion of the single cable and 38 refers to the rear portion of the single cable 34A and 36A refers to the front portion of single cable 36 and 40 refers to the rear portion of single cable 36A. This arrangement saves weight but for the purposes of simplicity will refer to cables 34A and 36A as being separate cables as in the modifications of an existing aerostat.

The presence of a wind in FIG. 2B represented by arrow D results in an increase in disposable lift DL and causes the novel active adaptive harness to move the TAP forward to maintain pitch and altitude and maintain a substantially constant tension on cables 34, 36, 38 and 40 but vary the length of the cables with respect to the TAP.

In prior art FIG. 1 the length of the cables remain the same with respect to the TAP but the tension on the cables change but are not redistributed. As indicated in FIGS. 2B and 3A a change occurs in angle A and between front cable 34 to the polygon 42 and the angle B to the rear cable to the polygon 42 as well as the angle C to the doted line 44 which represents the no wind condition. As long as the wind velocity is not considerably above an additional 80% of present specifications for the size of the aerostat the angles would stay within the geometric stability zone and are accommodated by the dynamic adaptive harness and computer to control a motor to redistribute tension on the cables and change the length of cables 34, 36 and 38 and 40 redistribute tension on the cables and with respect to the TAP Aerostat 30 without the assistance of elevators has to rely exclusively on the active adaptive device to move TAP. Depending on design and the position of the two front attachment patches 18A with respect to the two rear attachment patches 18B and their strength winds above 120 mph can be accommodated with the angles A and B changed by the active adaptive harness to keep the TAP within geometrical rectangular polygon 42 that forms the stability zone for the geometric suspension control system.

Referring now to FIGS. 4A, 4B and 4C changes in the geometric rectangular polygon 42 is illustrated for a three suspension cable system 42A having cables with two front cables 48 and 50 and one rear cable 52. In a three cable application of the invention cables 48 and 50 preferably are front cables and 52 is a rear cable to purposes of controlling pitch. In FIG. 4A a triangular shaped polygon defines a geometric stability zone 42A in which a single motor with a pulley either winds two cables 48 and 50 together while simultaneously unwinding single cable 52 in response to wind velocity change. The loop in this case is formed by splicing the ends of cables 48 and 50 together with the end of cable 52 and connecting them to a single pulley with a guide to accommodate the odd number of cables.

The polygonal geometric stability zone 42B of FIG. 4C is formed by the confluence of 6 cables 60, 62, 64, 66, 68 and 70. A hexagonal geometric stability control zone for the 6 cable harness is controlled by a computer in this embodiment. The control of the 6 cables by the computer can all control pitch or be paired to control other axes as will be described hereinafter in greater detail. The shape of the geometric stability control zone is defined by the number of cables. The three sided polygon with three cable bridle lines is not as stable as the four sided quadrilateral one due to the fact the stability zone is larger. The hexagonal polygon is more stable for the same reason. Increasing the cable lines is good to spread tension and redundancy which however adds weight and complexity of control which in some cases is limited by weight restrictions by the number of motors and pulleys required to control the length and tension on the cables to control pitch.

In FIG. 5C cables 34 and 38 and cables 36 and 40 form two separate loops. One of the two separate loops such as loop 36A is looped around a pulley of motor 80 while loop 34A is looped around a pulley of motor 80 while loop 34A is looped around a pulley of motor 82. When both motor 80 and 82 both turn in the same direction the pitch of the aerostat is changed. In the preferred embodiment motors 80 and 82 are differential winch motors with an integrated 4 stage planetary gear reduction set with a net 225:1 gear ratio that can provide a 20 Newton-meter torque and weigh about 2 kg and preferably with a cycloidal reduction gear set. Application of motors with differential winching provides more control and when motor 80 turns in one direction and motor 82 turns in the opposite direction yaw control can be controlled as well as pitch.

Figure 7:
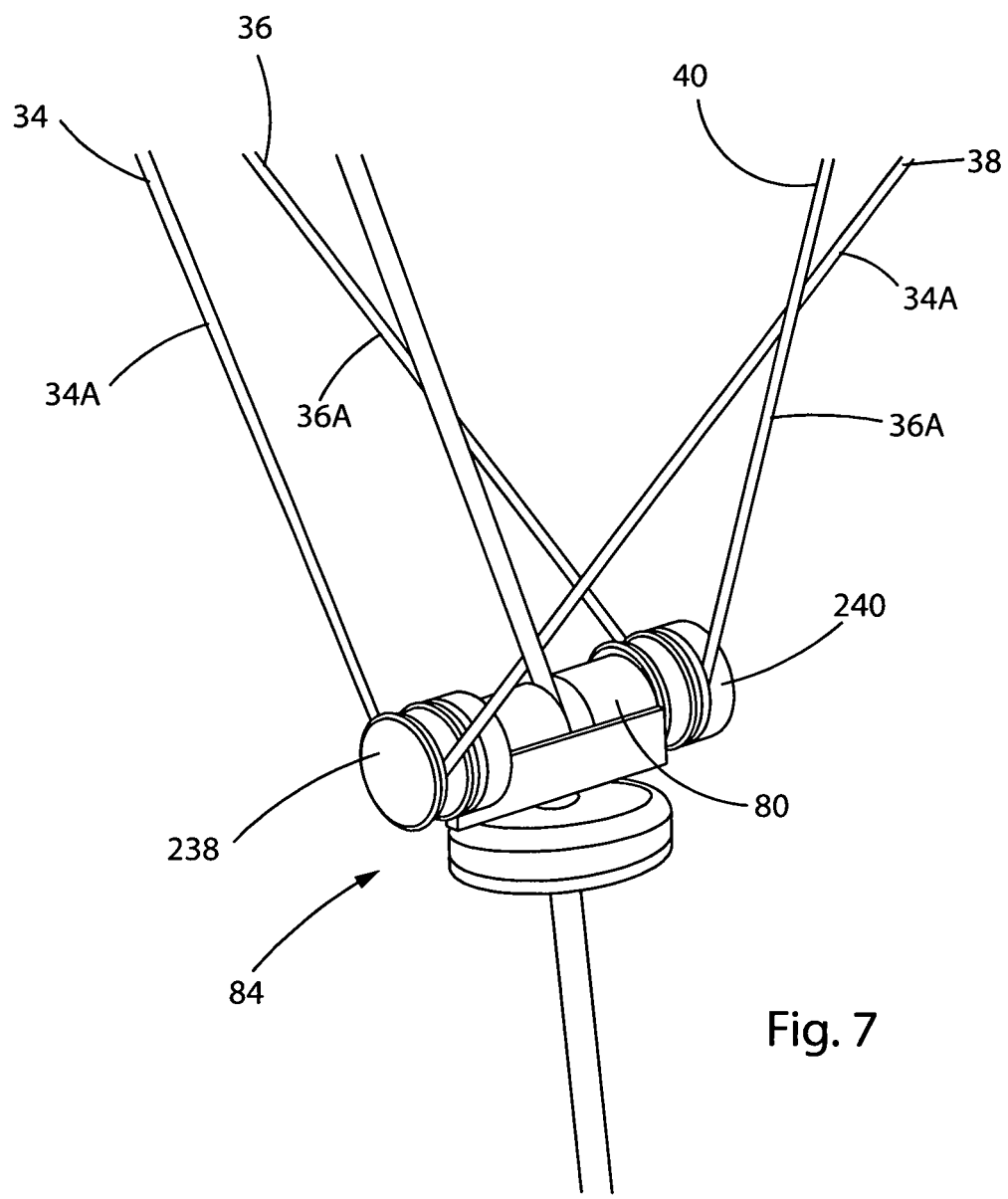
FIG. 7 is a perspective view of an active adaptive control device to accommodate a supply of lift gas and control the adaptive harness to increase flight duration of a tethered aerostat.

In addition to pitch the novel adaptive harness can control both pitch yaw and roll. Referring now to FIG. 5A and FIG. 5B a rectangular safety zone polygon is formed by front cables 34 and 36 and rear cables 38 and 40 as heretofore described. The adaptive harness is controlled by a first differential motor 80 to control the position of the TAP on single cable 34A and differential motor 82 on single cable 36A in a winch control assembly 84 (FIG. 7). Differential motor 80 and differential motor 82 control the position of the TAP in relation to the forward length 34 and 36 and the rearward lengths 38 and 40 as heretofore discussed to control yaw.

Figure 8:
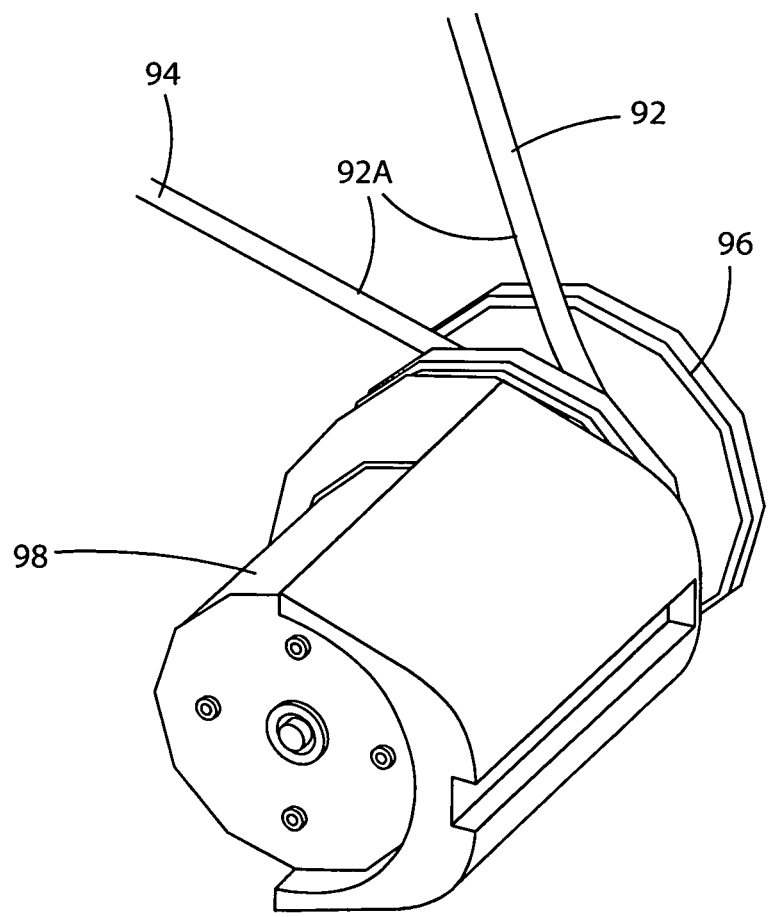
FIG. 8 is a perspective view of second control winch to accommodate a third flight axis for the novel adaptive harness.

Roll axis is controlled by adding a second level winch 90 (FIG. 5A FIG. 8). In this arrangement two cables 92 and 94 are added which in the preferred embodiment is a single cable forming a loop 92A around pully 96 of motor 98 to simultaneously wind and shorten cable 92 while unwinding and lengthening cable 94 to roll airship 30 in one direction and lengthen cable 92 and shorten cable 94 in the other direction to change roll in the other direction. Pitch, yaw and roll can thus be controlled by changing only the novel adaptive harness to impart coordinated flight to an aerostat without having to change the architecture of existing airships and aerostats.

It will be recognized that changes may be made to the architecture of the airship to further enhance the advantages of the adaptive harness. For example the fins 32 may be adapted to include moveable tail surfaces. The addition of a movable tail surface 96 to fin 98 FIG. 6C and FIG. 6B adds further pitch control and yaw control to airship 30 to further increases the ability of airship 30 to accommodate heavy wind conditions by providing together with the novel adaptive harness even greater pitch control. Similarly the addition of control surface 96 to rudder 100 provides additional yaw control to accommodate large shifts in wind direction and velocity. The addition of lift gas replenishment feed tube 102 as illustrated and in FIG. 6A and FIG. 6B is a further modification of the aerostat to receive lift gas from the ground through feed tube such as shown in U.S. Pat. Nos. 7,708,223, 8,083,174 and 8,485,465.

Other modifications can be made such as increasing the size, number and strength of the attachment patches 18A and 18B (FIG. 3A). In addition drive motors with winches could be placed inside the airship with strengthening structure in the control patches 18A and 18B to control the novel adaptive harness. This embodiment is not preferred as four motors weigh significantly more than 2 motors and winding one end of the cable while simultaneously unwinding the other end to move the TAP adds considerable weight in terms of hard points or structure required to support the motors and pulleys as well as requiring more cable instead of having a single cable loop 34A and single cable loop 36A and move the TAP along the single cables 34A and 36A with pair of motors as illustrated in FIGS. 7 and 9.

Figure 9:
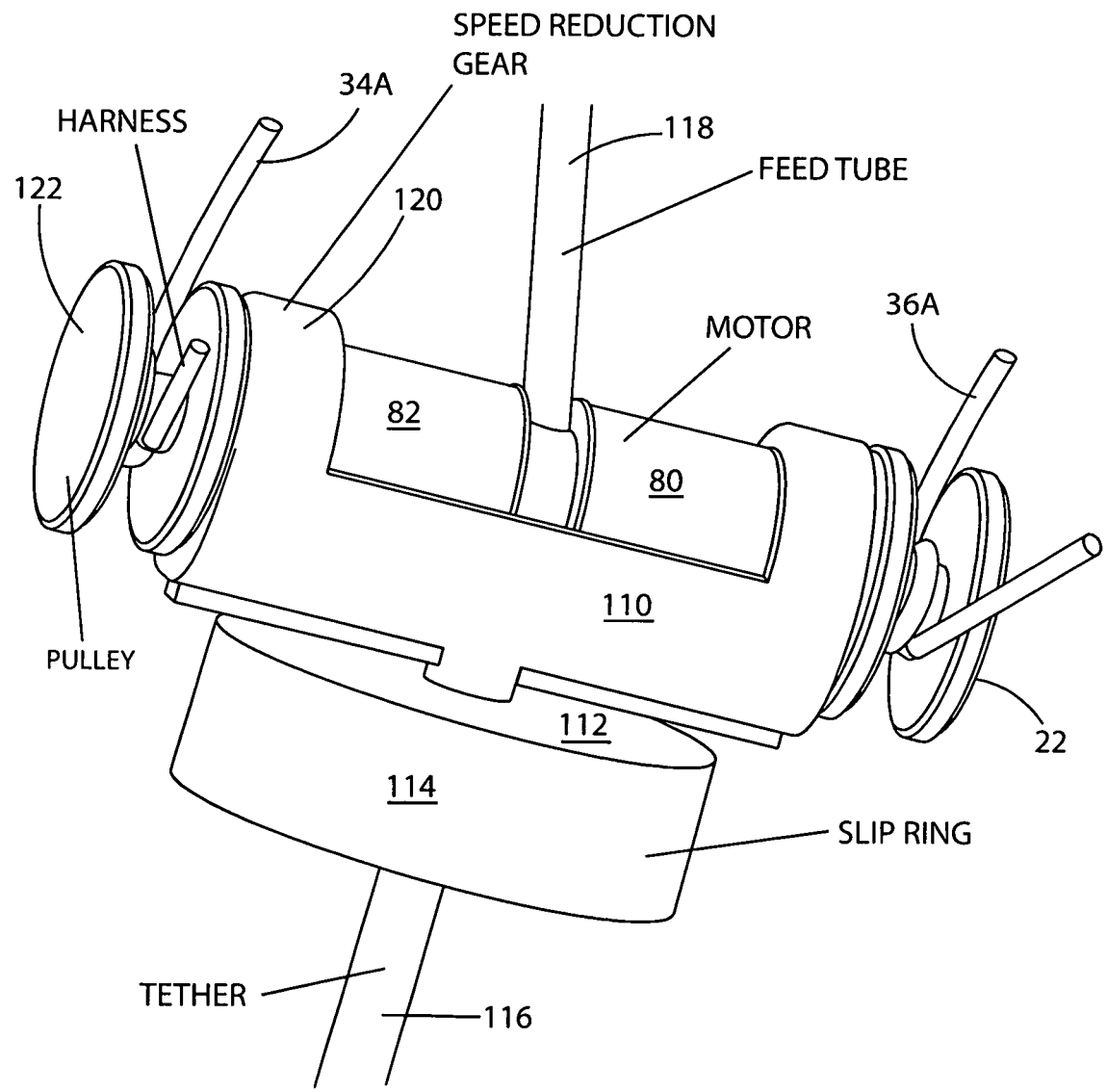
FIG. 9 is a perspective view of a winch assembly for accommodating a lift gas replenishment tube for the novel adaptive harness.
Figure 10:
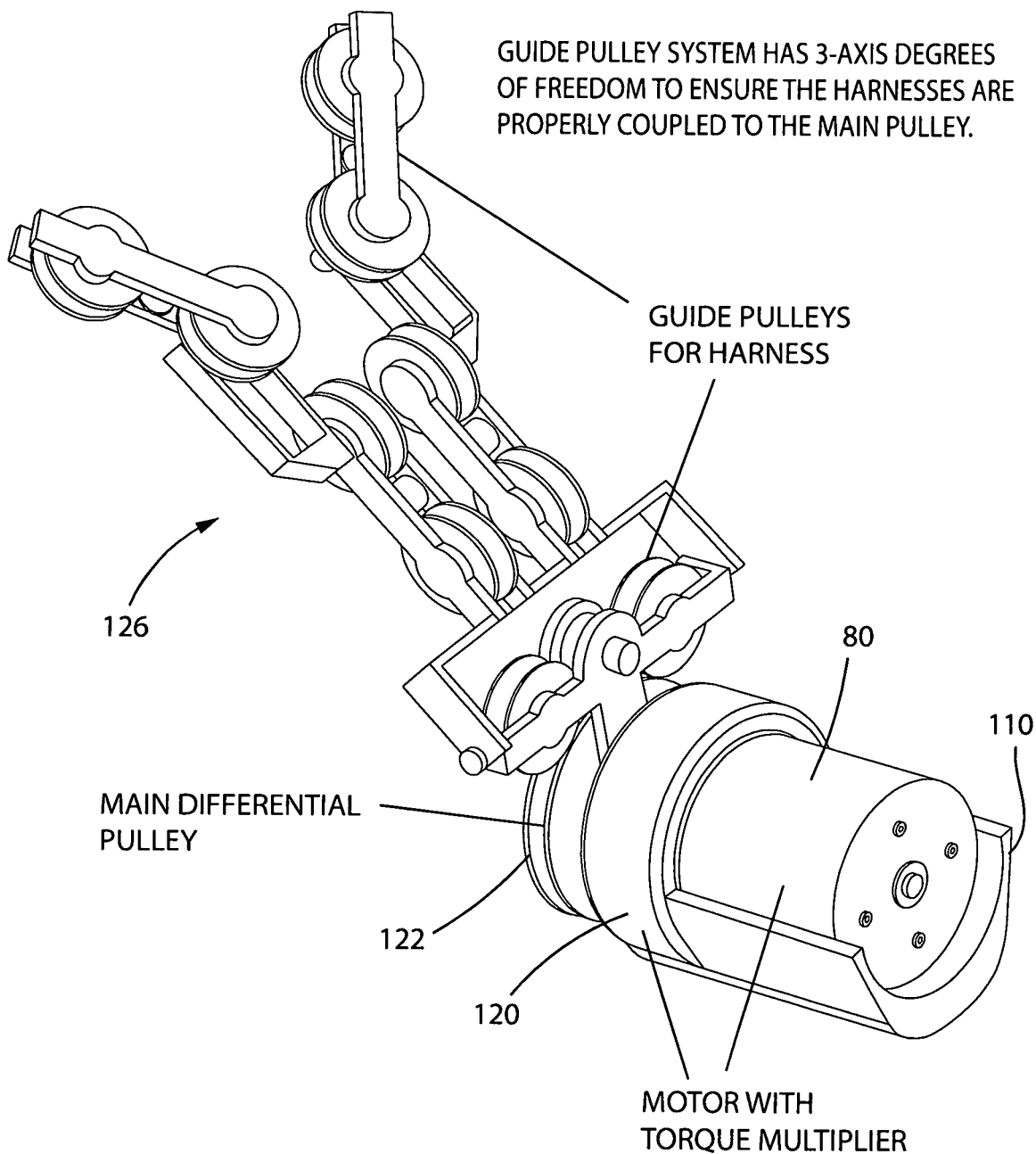
FIG. 10 is a perspective view of one half of winch assembly of FIG. 9 for accommodating the lift gas replenishment tube illustrating one embodiment of a cable guide for the pulleys for the novel adaptive harness.

Referring now to FIGS. 5A, 9 and 10 the differential motors 80 and 82 are illustrated in a housing 110. Housing 110 may be connected directly to the top plate 112 of slip ring 114 or be separate from top plate 112. Slip ring allows the tether and preferably a tether with a feed tube 116 to rotate freely within the bottom of the slip ring while housing 110 remains stationary with respect to aerostat 30. Feed tube 116 extends to slip ring 114 and reconnects with feed tube 118 which extends to aerostat 30 as illustrated in FIGS. 6A and 6B. Free rotation is provided between the tether and slip ring and in accordance with the invention the weight of the tether is used in making changes to the novel adaptive harness.

Each differential motor 80 and 82 includes a torque multiplier with a speed reduction gear 120 connected to a main differential pulley 122. Main differential pulley housing includes a cable guide device can be a channel guide pipe or a 3 axis guide pulley system 126 (FIG. 10) to ensure the laterally extending cables are guided into the pulleys 122.

Figure 11:
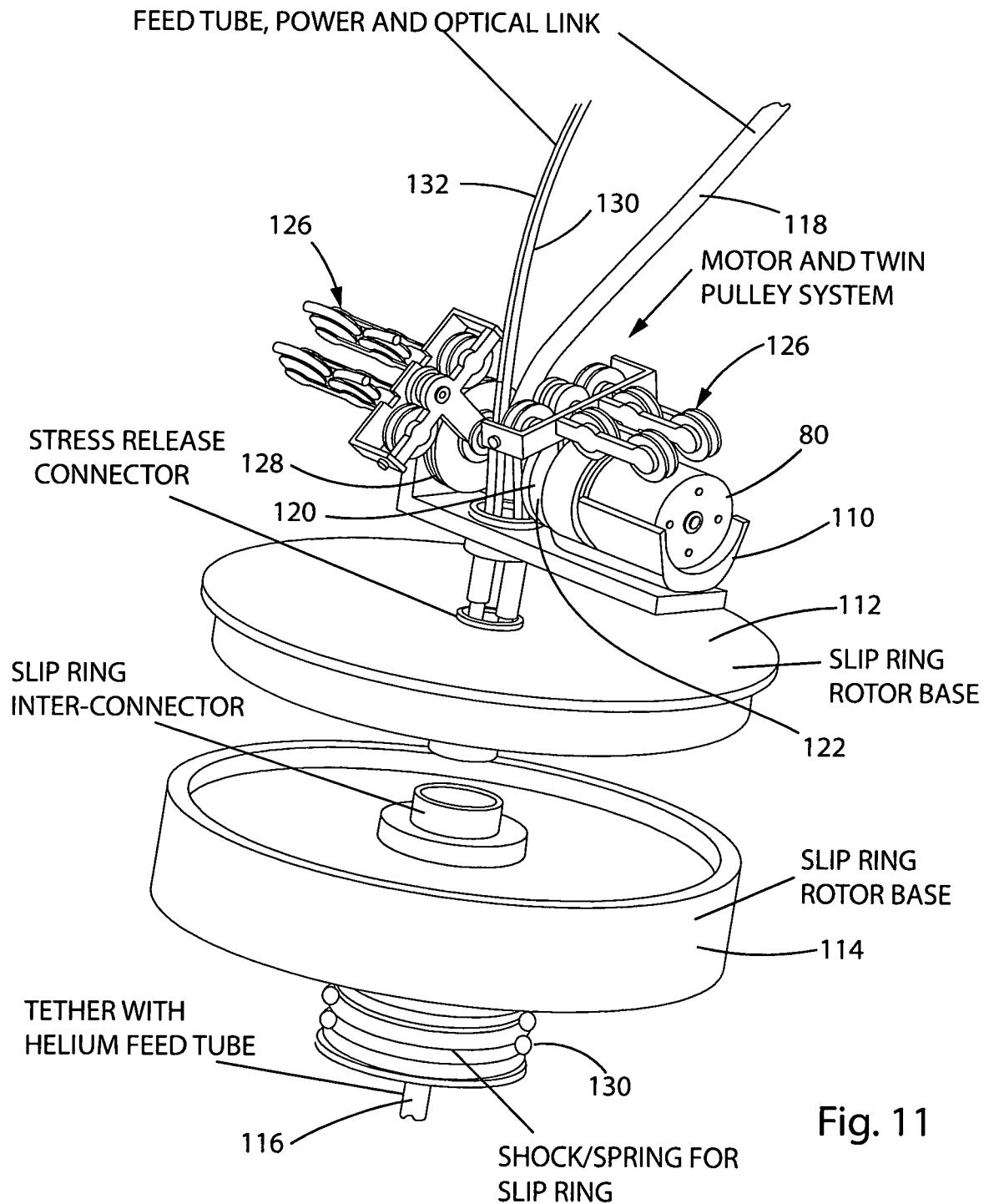
FIG. 11 is an exploded view of an alternative embodiment of the invention utilizing a single motor with twin cable guides to control the novel adaptive harness.

Referring now to FIG. 11 an exploded view of the slip ring and a control system for the adaptive harness is illustrated employing a single motor 80 with two pulleys one pulley, pulley 122 for cable 34A and one pulley pulley 128 for cable 36A. Each pulley is disposed on a common shaft from motor 80 which provide a weight advantage and avoids the coordination of having two motors 80 and 82 and being coordinated to accommodate the pitch axis. Each pulley 122 and 128 includes a separate 3 axis guide pulley system 126. The slip ring base 114 includes a shock/spring 130 connector for tether 116. The slip ring base includes a slip ring connector for the lift gas feed tube 116 and an electrical connector for the electrical wires 130 in the tether as well as any connector for an optical or communication cable 132.

Figure 12:
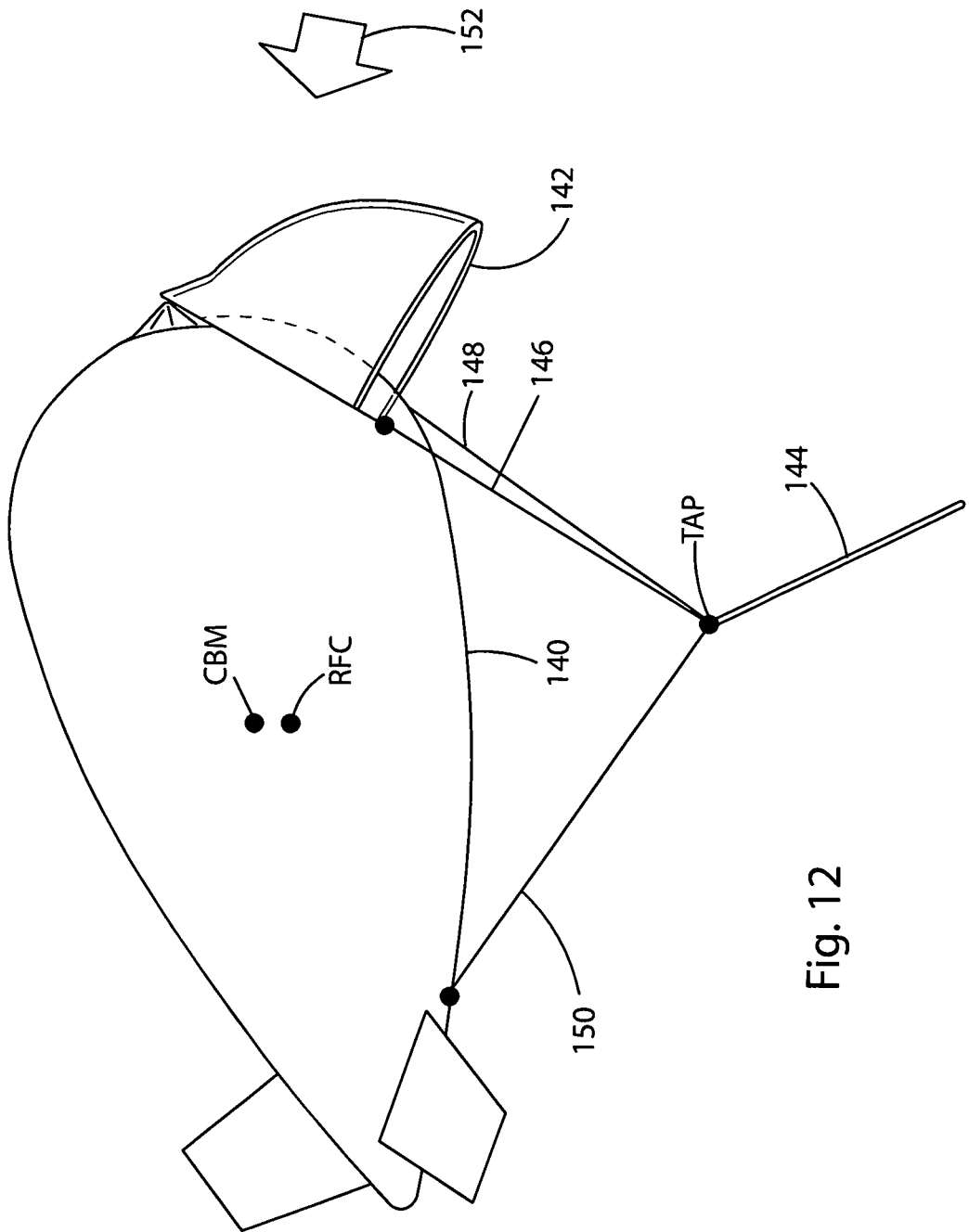
FIG. 12 is a side elevation view of a passive adaptive control device to control the novel adaptive harness in light wind or no wind to increase the flight duration of a tethered aerostat.
Figure 13:
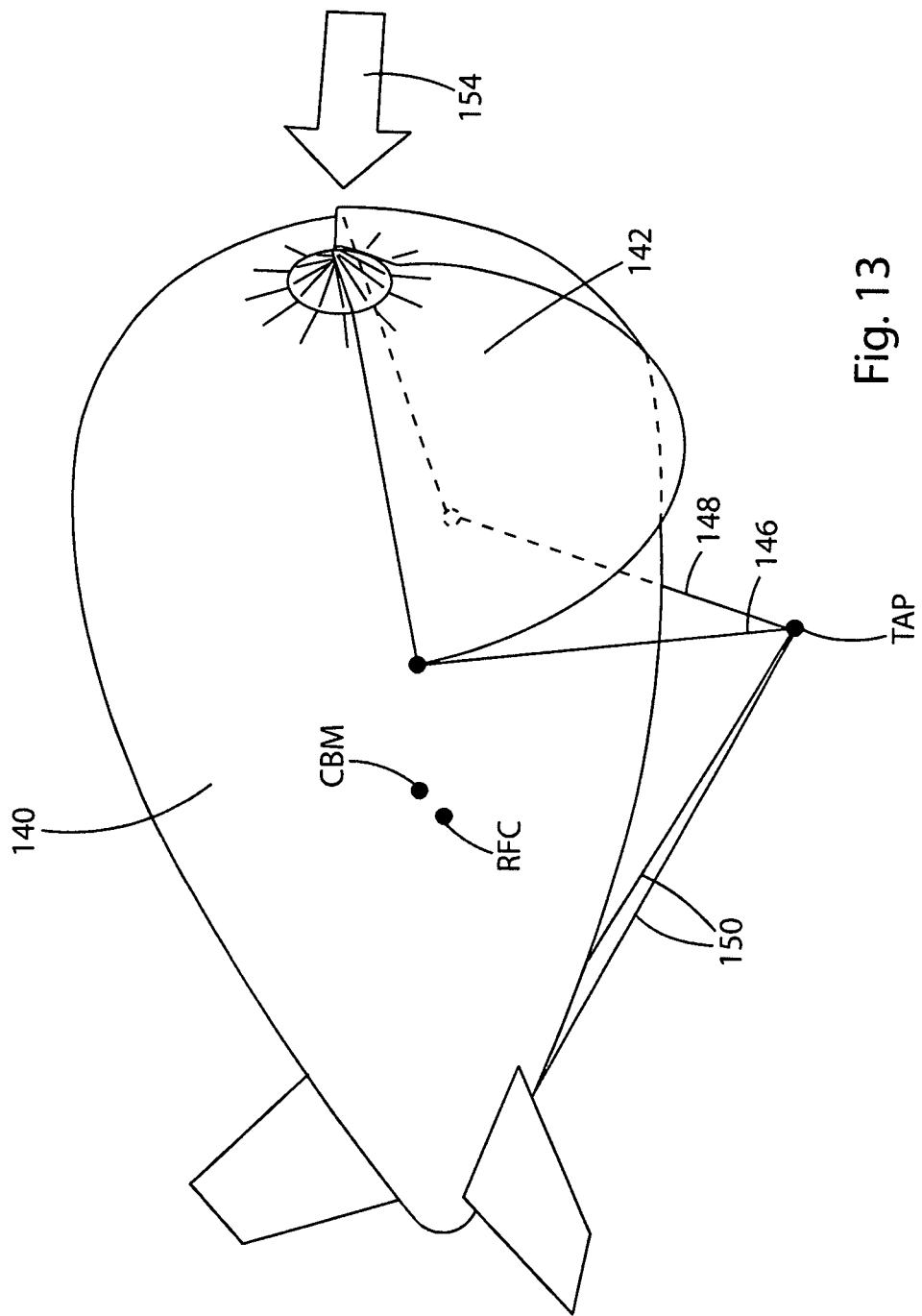
FIG. 13 is a perspective view of the passive adaptive control device of FIG. 12 to control the novel harness in a high wind to increase the flight duration of a tethered aerostat.
Figure 14:
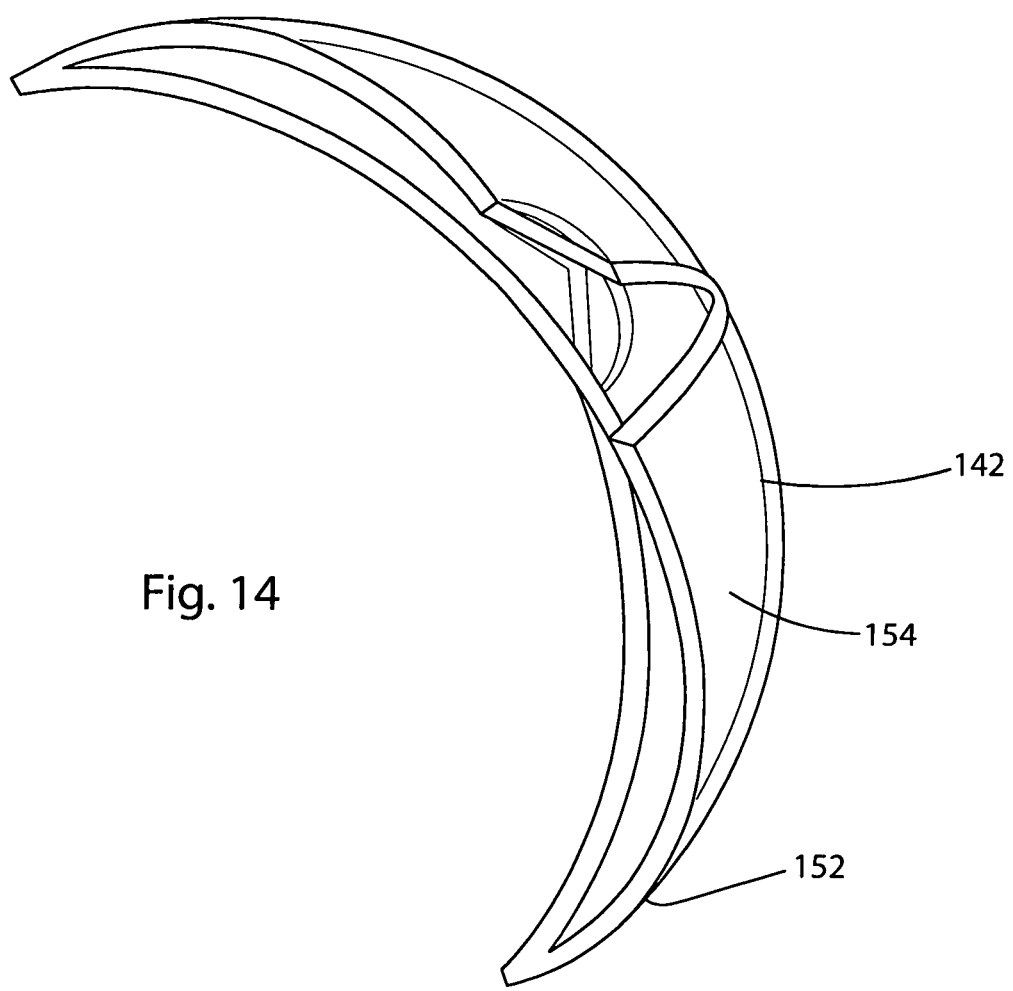
FIG. 14 is a front view of the passive adaptive control device of FIG. 12.

Referring now to FIGS. 12, 13 and 14 a passive adaptive device is illustrated to move the TAP in relation to the CBM/RFC in tethered aerostat 140, As illustrated in FIG. 12 the canard 142 is in a low or no wind environment. The canard 142 is appended from the nose of the airship and is connected to tether 144 by a pair of cables 146 and 148. One or preferably two rear cables 150 connect the TAP to the rear portion of airship 140. In this embodiment of the invention the cables 146, 148 and 150 can be spliced into the tether without further modification of a prior art tether. In the best mode canard 142 is used with a winch in which case cables 146 and 148 and cable 150 are looped around a pulley 96 and operated by a motor as shown in FIG. 8.

The canard 142 as illustrated in FIG. 12 is in a no wind or low wind environment. As the wind increases as represented by arrow 152 to otherwise on airship 140 moveable canard moves from its open position in FIG. 12 to its closed position in FIG. 13 which moves the loop perpendicular to the aerostat formed cables 146 and 148 to their closed position which moves the TAP forward in much the same manner as the active adaptive device for the novel harness as previously described. The canard 142 includes a lightweight canard frame 152 configured to conform to the nose of the aerostat. The frame is made of plastic and other material which is covered by a thin film of plastic or other such lightweight material to allow wind to close the canard.

Referring now to FIGS. 15A, 15B and 16A and 16B a further passive adaptive device 162 or nose canard is provided for airship 160 which may be a standard airship modified with the novel adaptive harness or an airship specifically constructed to include moveable tail surfaces as heretofore discussed. The passive adaptive canard is appended between a loop formed by forward cables 34 and 36 or preferably on the front part of single cable 34A and 36A. The canard 162 is illustrated as deployed in a no wind or light wind environment in FIGS. 15A and 15B. Canard 162 may be made of the same lightweight material as canard 142 as heretofore discussed.

Figures 16, 16A, 16B:
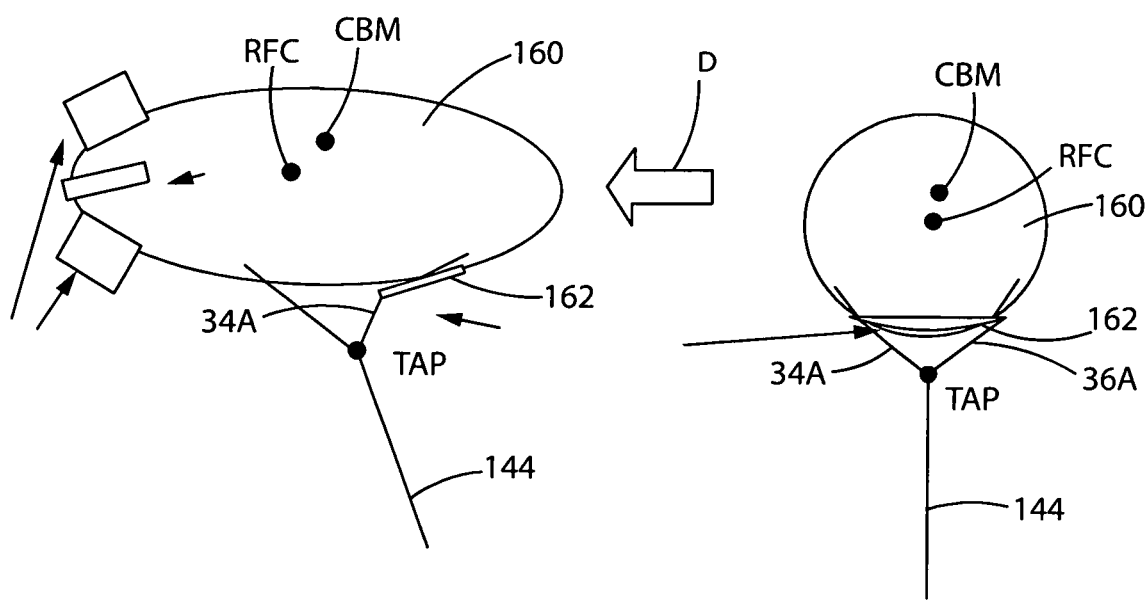
FIG. 16 collectively consists of FIGS. 16A and 16B which includes in FIG. 15A a side view of the passive adaptive control device of FIG. 15A
FIG. 16B is a front view of FIG. 15B illustrating the novel adaptive harness in a high wind to increase the flight duration of a tethered aerostat.

Canard 162 upon encountering a strong wind as represented by arrow D in FIG. 16A results in the closing of canard 162 and the shortening of cables 34A and 36A to keep the TAP in the stability zone geometric control system of the invention as heretofore described.

Figure 17:
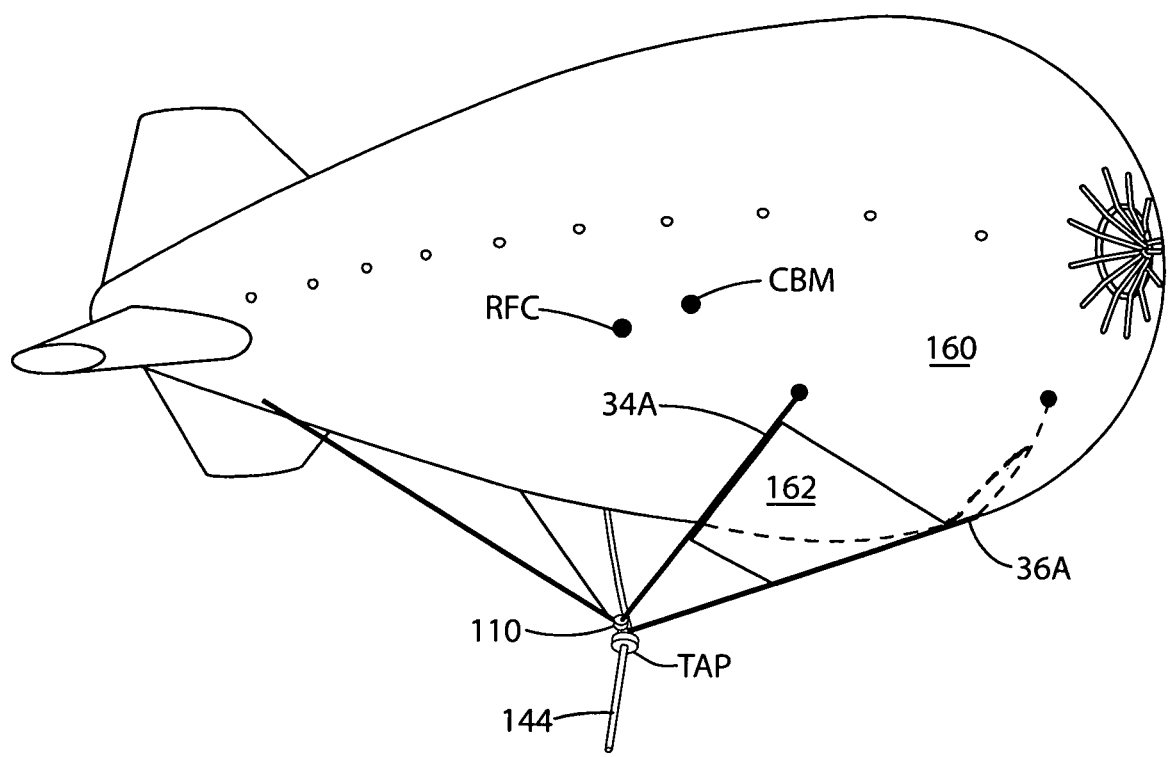
FIG. 17 is a perspective view of an aerostat with an active adaptive control device and a passive adaptive control device in a high wind with a lift gas replenishment tube in accordance with a preferred embodiment of the invention.

In FIG. 17 airship 160 is designed to include the benefits of both an active adaptive device using motors 80 and 82 in with pulleys in housing 110 connected to cables 34A and 36A as described with respect to FIG. 9 as well as the passive adaptive control using a canard 142 or 162. In this embodiment it should be noted an existing aerostat has been modified only by changing the architecture of the harness. It will be appreciated that motors 80 and 82 can be controlled with a computer from either the ground or aloft in housing 110 or preferably from existing onboard computers in aerostat 160 to achieve the advantages of the invention. It will be further appreciated that aerostat 160 could be further modified to include moveable tail surfaces to provide further resistance to strong winds and together with a ground based lift gas replenishment system to further extend the duration of in flight deployment.

Figure 18:
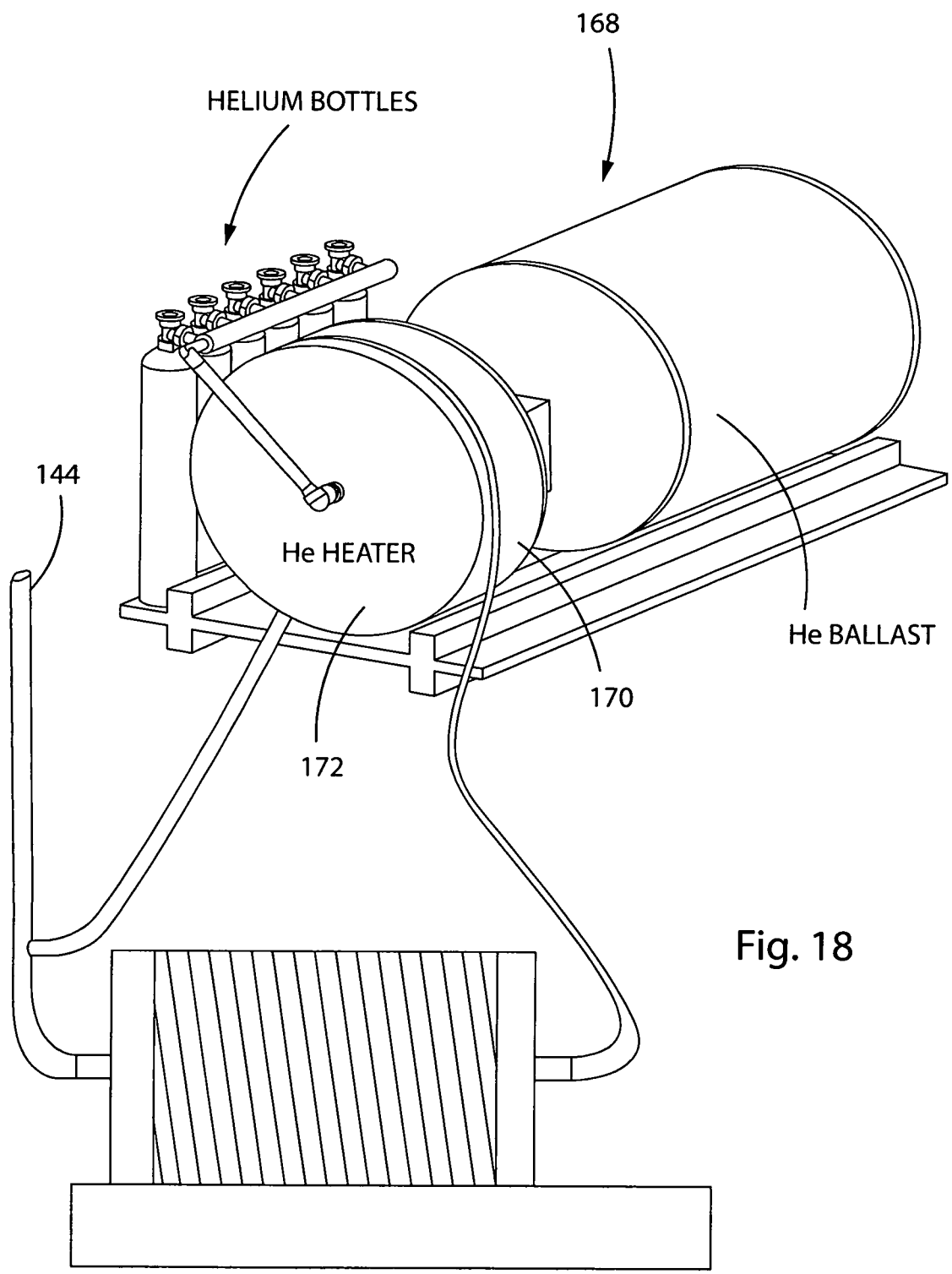
FIG. 18 illustrates a ground based system for supplying lift gas and particularly a heated helium lift gas to the tethered aerostat.

In regard to extending flight duration the ground based helium deployment system 168 of FIG. 18 provides not only a helium lift gas reservoir 170 but also a heater 172 for heating the lift gas to send heated and replenished lift gas to tethered aerostat 30 or 160 or novel aerostats modified to receive a helium lift gas replenishment tube.

Aerostats and Airships constructed in accordance with the invention will have a harness line that forms a single control loop of harness operated by a differential winch. In turning the winch in one direction one end of the length of the harness cable gets longer while the other length of the harness cable gets shorter. When both motors 80 and 82 turn the same direction the nose will either pitch up or pitch down. When the motors 80 and 82 are turned in opposite directions the aerostat will yaw to the left or the right.

Figure 19:
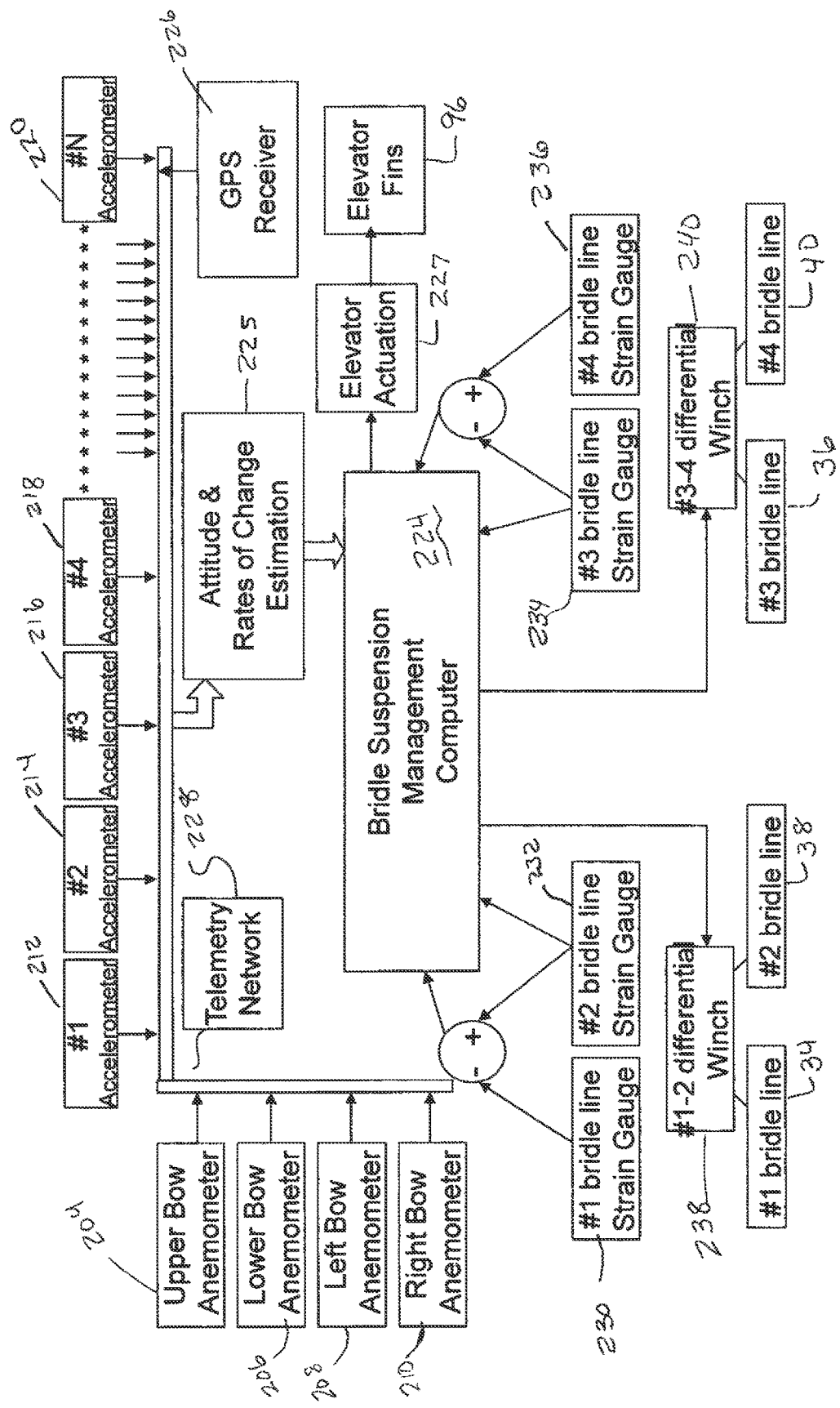
FIG. 19 illustrate a diagram for a suspension management system for an aerostat having a dynamic adaptive harness in accordance with the invention.

The advantages of the novel adaptive harness are further expanded by controlling the harness with a suspension management system an example of which is illustrated in FIG. 19. At least four anemometers should be used including an upper bow anemometer 204, a lower bow anemometer 206, a left bow anemometer 208 and a right bow anemometer 210 also as shown in FIG. 3A. A plurality of accelerometers as represented by blocks 212, 214, 216, 218 and 220 are also attached to the airship at various locations on the aerostat along with anemometers provide data to a bridle suspension management computer 224. An optional GPS device 226 may be provided along with an optional telemetry data acquisition network 228. A first bridle strain gauge 230 can be placed on line 34 (FIG. 3A) a second bridle strain gauge 232 can be placed on line 38 and a third strain gauge 234 can be placed on line 36 and a fourth strain gauge 236 is place on line 40.

The bridle management computer provides data to the bridle management computer 224 to operate differential winch 238 and 240 (FIG. 7) to change the length and tension on line 34, 38 and line 36, 40. The accelerometer data can be time integrated to provide a reasonably accurate estimation of the attitude and time rate of change attitude vector to anticipate short term changes. GPS data receiver when available can be combined with anemometer data and acceleration data to provide a vector estimator.

Figure 20:
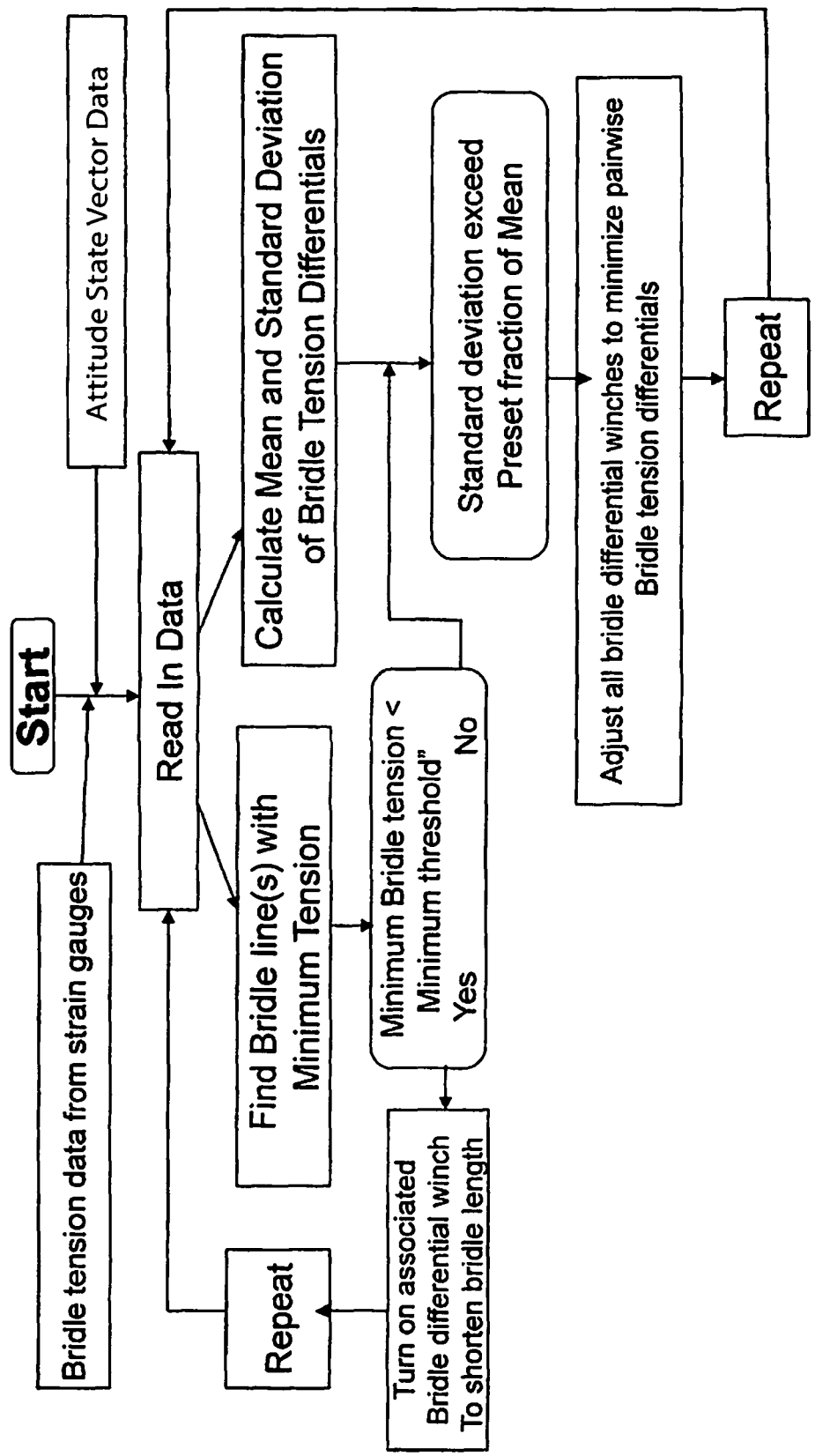
FIG. 20 illustrates a cable harness or bridle tension control flowchart for the dynamic adaptive harness.

The combination of data by the bridle suspension management computer is used to provide a predictive estimation algorithm to serve as a mathematical model to compare actual inputs with pervious predictions which are used to train the computer to minimize overcontrol or undercontrol of the aerostat with an altitude and rates of change estimation system as represented by block 225 (FIG. 19). Optionally the bridle suspension management computer may include and operate an optional elevator device as represented by block 227 to operate optional moveable fins 96 on the rudder or elevator as illustrated in FIG. 6C. A bridle tension control flowchart for bridle management computer is illustrated in FIG. 20. In FIG. 20 data from bridle strain gauges 230, 232, 234 and 236 as well as attitude state vector data is provided to bridle suspension management computer 224 which compares bridle tension with minimum tension with a calculated mean and standard deviation to operate or not operate the one or more bridle winches to change the attitude of the aerostat.

Figure 21:
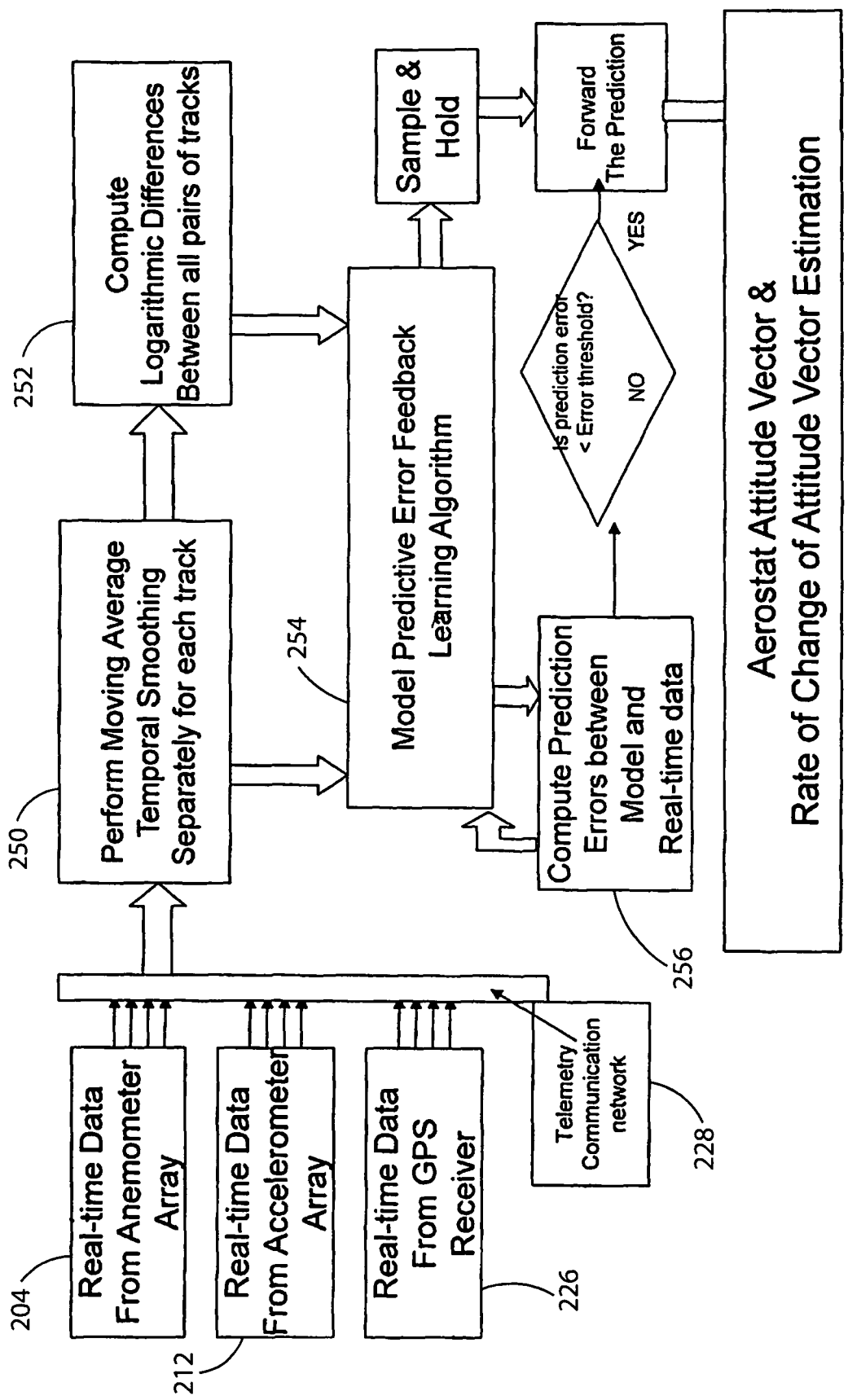
FIG. 21 illustrates an aerostat data acquisition and processing flowchart for the dynamic adaptive harness.

FIG. 21 provides a further system for acquiring and processing aerostat attitude data. In this application heavier computer equipment is ground based including the process of perform moving average represented by block 250 computing the logarithmic differences represented by block 252 the modeling of predictive error feedback represented by block 254 and computing of prediction errors represented by block 256. A bidirectional link through telemetry communications network 228 provides real time data from the anemometers 204, 206, 210 and accelerometers 212, 214, 216, 218 and 220.

Figure 22:
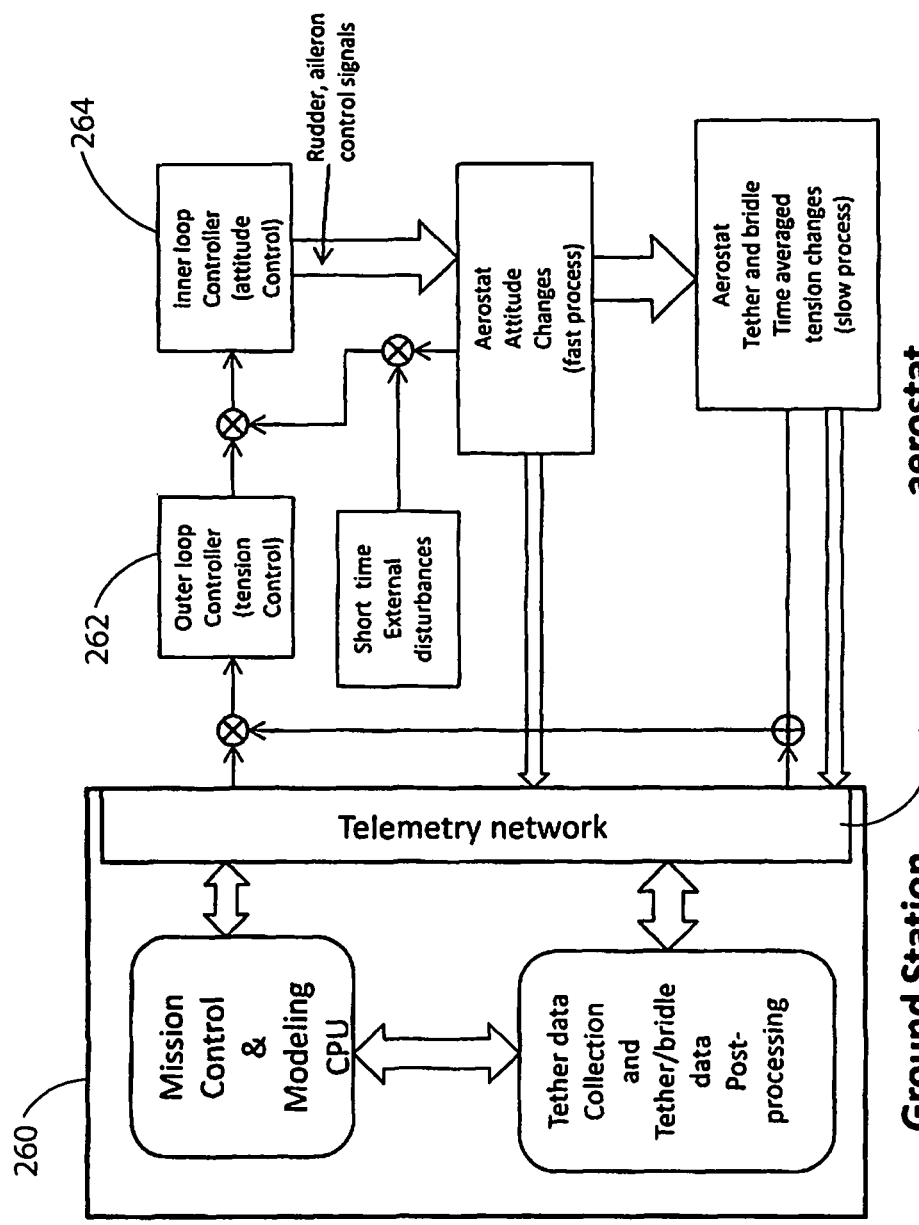
FIG. 22 illustrates a cascade inner/outer loop control for the dynamic adaptive harness.
Figure 23:
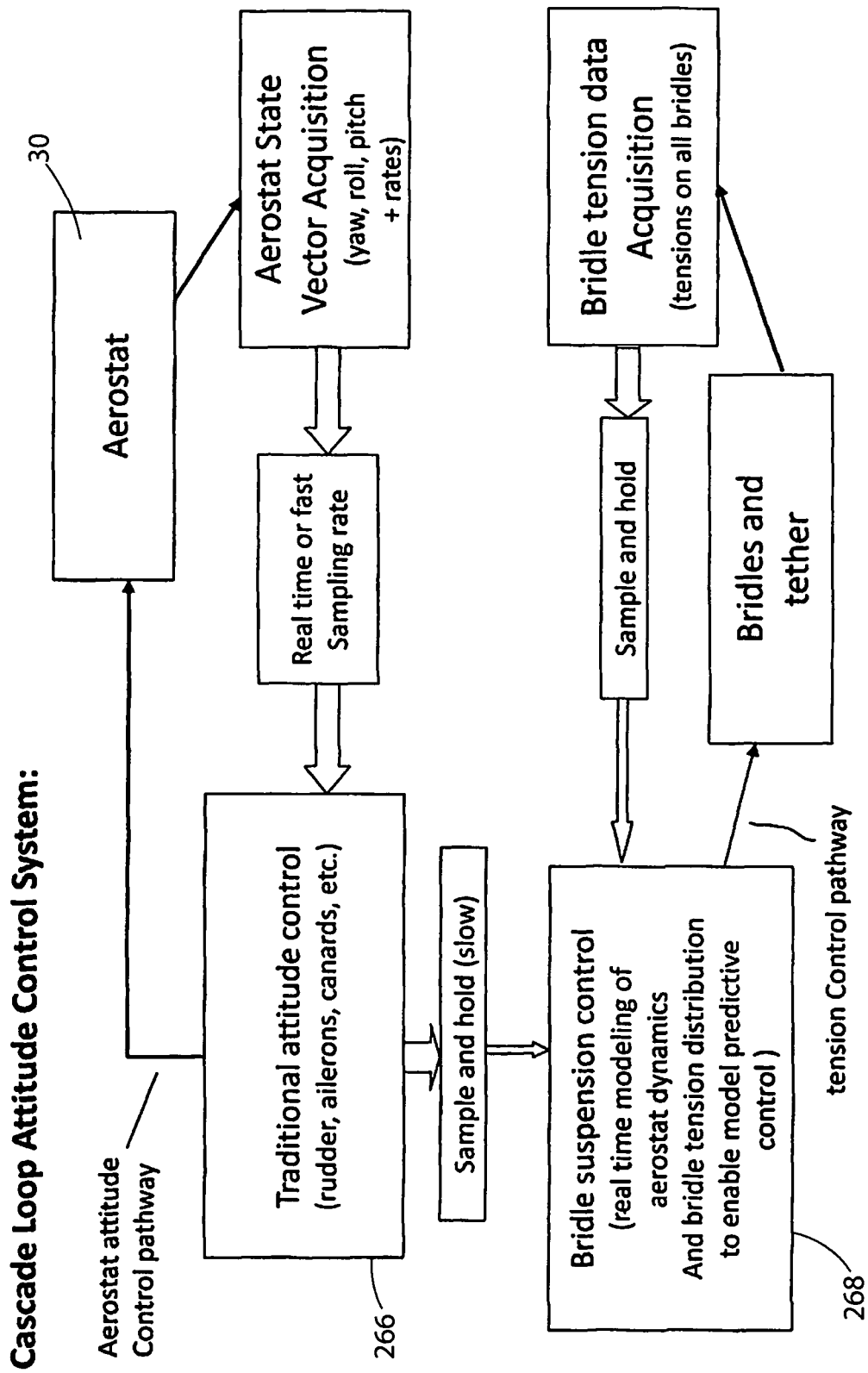
FIG. 23 illustrates a cascade control system; view for the dynamic adaptive control harness.

Referring now to FIGS. 22 and 23 cascade control system is illustrated. In FIG. 22 a control architecture for a cascade system between the ground and a deployed tethered aerostat is illustrated. The ground station represented by block 260 communicates with aerostat controllers and processors as represented by outer loop controller 262 inner loop controller 264. Aerostat 30 may optionally include traditional attitude control as represented by block 266 or the novel moveable canard 142, 162 of the invention in which input in the form of strain gauge readings are used to determine the status of the deployment of the moveable canard as part of the bridle suspension control as represented by block 268. Also data from the anemometers and accelerometers and bridle suspension is obtained and analyzed.

In FIG. 22 and FIG. 23 the cascade inner/outer loop control because of inherent high environmental noise or disturbance. The nested control system of a cascade system provide the advantage of a more responsive performance by canceling out or rejecting high multiple disturbances. In traditional aerostats the bridle suspension is fixed and is fixed to the tether attitude control relies primarily on moving any available control surface to maintain the stability of the aerostat or removing the aerostat from service due to the operational limitations. The invention removes the fixed spliced link between the tether and cables and allows the cables to be moved separately with respect to the tether to impart pitch, yaw and roll control to allow tethered aerostats to fly like an airplane in response to adverse weather conditions.

In providing a dynamic adaptive harness controlled by a computer the suspension geometry can be altered in response to varying meteorological conditions and especially high winds. Aerostats have a large aerofoil surface but typically small control surfaces in relation to their body. This problem is now resolved by using active or passive adaptive devices or a combination to control a tethered aerostat like an airplane by using pitch, yaw and roll to fly through varying meteorological conditions including high winds by providing a dynamic adaptive harness.

The invention has a wide range of applicability to airships as well as tethered aerostats. The application of a geometrical suspension control system is compatible with many types of airships having a suspended payload with the ability to shift that payload in response to environmental conditions.

The invention is particularly applicable to tethered aerostats and the use of the weight of the tether to change pitch, yaw and roll and fly an aerostat through high wind and inclement environmental conditions. In addition a high degree of variation is provided in selecting between the active and passive devices and their combination. While all may be combined it is contemplated that depending the flight mission not all the aspects of the invention may be used at one time.

As used herein and in the following claims, the words "comprising" or "comprises" is used in its technical sense to mean the included enumerated elements and equivalents but do not exclude other possible additional elements which may or may not be specifically included in the other claims. It will be understood such additional elements, whether or not included in the dependent claims, are modifications that both can be made within the scope of the invention. It will be appreciated by those skilled in the art that a wide range of changes and modifications can be made to the invention without departing from the spirit and scope of the invention as defined in the following claims.

What is claimed is:

1. An adaptive airship apparatus with an adjustable harness for flight control comprising:
    (a) a plurality of continuous cables connecting one surface of the airship to another surface of the airship to form a plurality of loops;
    (b) a weight or mass disposed below a confluence of the plurality of loops;
    (c) a plurality of winch pulleys disposed intermediate the weight or mass and the plurality of loops with at least one of the plurality of loops looped around at least one of said plurality of winch pulleys; and
    (d) a motor to operate the plurality of winch pulleys to shift the weight or mass with respect to a center of lift of the airship to control at least one flight axis.

2. The adaptive airship of claim 1 wherein the weight or mass is a tether.

3. The adaptive airship of claim 2 wherein the motor is a differential winch motor with an integrated four stage planetary reduction gear set.

4. The adaptive airship of claim 3 wherein the motor controls a pitch axis.

5. The adaptive airship of claim 3 further comprising a second differential winch motor with an integrated four stage planetary reduction gear set.

6. The adaptive airship of claim 5 further comprising a computer to control the differential winch motor and the second differential winch motor in response to change in an environmental condition.

7. The adaptive airship of claim 5 wherein a winding of the first and second motor in a same direction controls pitch of the airship.

8. The adaptive airship of claim 5 wherein a winding of the first and second motor in different directions controls a yaw of the airship.

9. The adaptive airship of claim 8 further comprising a third differential motor with an integrated four stage planetary reduction gear set connected to a loop between the first and second motor to control roll of the airship.

10. The adaptive airship of claim 3 further comprising a slip ring disposed between the differential winch motor and the tether.

11. The adaptive airship of claim 5 further comprising a lift gas replenishment feed tube.

12. The adaptive airship of claim 11 wherein the lift gas replenishment feed tube extends from a ground station to the airship.

13. The adaptive airship of claim 12 further comprising a lift gas heater disposed in the ground station to heat a replenishment lift gas.

14. The adaptive airship of claim 4 further comprising a passive adaptive device.

15. The adaptive airship of claim 14 wherein the passive adaptive device is a canard.

16. The adaptive airship of claim 15 wherein the canard is disposed between one of the plurality of loops.

17. The adaptive airship of claim 6 wherein the computer provides a cascade loop attitude control.

18. An adaptive aerostat harness device comprising:
    (a) a first aerostat cable or line having a first end connected to an aerostat and a second end connected to the aerostat or is spliced together with another cable or line connected to the aerostat to form a continuous loop;
    (b) a second aerostat cable or line connected to the aerostat with a second end connected to the continuous loop;
    (c) a pulley or winch to wind one side of the continuous loop and simultaneously unwind the other side of the continuous loop disposed around the pulley or winch or the second aerostat cable or line;
    (d) a weight or mass disposed below the pulley or winch; and
    (e) an adaptive device that shifts the weight or mass with respect to the center of lift of the aerostat in at least one flight axis in response to a wind or an environmental condition.

19. The adaptive aerostat harness of claim 18 wherein the continuous loop substantially spans an entire length of the aerostat.

20. The adaptive aerostat harness of claim 19 wherein the adaptive device is a canard.

21. The adaptive aerostat harness of claim 20 wherein the canard is connected to adjacent sides of the continuous loop.

22. The adaptive aerostat harness of claim 18 wherein the continuous loop is connected to the second aerostat cable of the aerostat.

23. The adaptive aerostat harness of claim 22 wherein the adaptive device is an active adaptive device driven by a motor having a pulley disposed between the continuous loop and the second aerostat cable.

24. The adaptive harness of claim 22 wherein a second aerostat cable or line has a second end connected to the aerostat or is spliced together with another cable or line to form a second loop to substantially span an entire length of the aerostat.

25. The adaptive harness of claim 24 further comprising a second motor with a pulley operatively connected to the second loop.

26. The adaptive harness of claim 25 further comprising a three axis guide for the continuous loop and said second loop.

27. The adaptive harness of claim 24 wherein the motor is a differential winch motor with a four stage planetary reduction gear set.

28. The adaptive harness of claim 24 further comprising a second motor with a differential winch motor with a four stage planetary reduction gear set operatively connected to the second loop.

29. The adaptive harness of claim 28 wherein when the motor and second motor turn in a same direction the pitch of an aerostat is changed and when the motor and the second motor turn in opposite directions the roll of an aerostat is changed.

30. The adaptive harness of claim 28 wherein the motor and the second motor are controlled by a computer.

31. A method of extending the flight duration of an aerostat in response to environmental change comprising:
(a) determining a geometric stability zone of an aerostat based on a number and position of cables;
(b) forming at least one pair of looped control cables;
(c) providing at least one motor with a pulley to operatively engage at least one loop of the at least one pair of looped control cables; and
(d) using a computer to maintain a tether attachment point within the geometric stability zone by operating the at least one motor to move the tether attachment point with respect to a center of buoyancy mass (CBM) or a resultant force center (RFC).

32. The method of claim 31 wherein the step of providing at least one motor includes having two motors with a pulley with each motor engaging at least one pair of the at least one pair of looped control cables.

33. The method of claim 31 wherein the computer uses a cascade control system or fuzzy logic.

34. The method of claim 31 further comprising the step of adding a passive adaptive device.

35. The method of claim 34 wherein the passive adaptive device is a canard.

36. The method of claim 31 further comprising the step of providing a lift gas replenishment tube.

37. The method of claim 36 wherein the lift gas replenishment tube extends from a ground to the aerostat.

38. The method of claim 31 wherein the lift gas replenishment tube provides heated replenished lift gas.

39. The method of claim 31 wherein the at least one motor is three motors with a pitch axis, yaw axis and roll axis controlled by at least one of the three motors.

40. A tethered aerostat comprising:
(a) a first aerostat cable or line having a first end connected to the aerostat and a second end connected to the aerostat or spliced together with another cable or line connected to the aerostat to form a loop;
(b) a second aerostat cable or line having a first end connected to the aerostat or spliced together with another cable or line connected to the aerostat to form a second loop;
(c) a motor having a winch pulley operatively connected to the loop;
(d) a second motor having a winch pulley operatively connected to the second loop;
(e) a tether providing a weight or mass disposed below the motor and the second motor; and
(f) a computer to control the motor and the second motor to control a pitch, yaw or roll axis of the aerostat in response to an environmental condition.

41. The tethered aerostat of claim 40 wherein the loop and second loop include a loop around the winch pulley of the motor and the second motor.

42. The tethered aerostat of claim 40 wherein the motor and the second motor have an integrated four stage planetary reduction gear set.

43. The tethered aerostat of claim 42 wherein turning the motor and the second motor in a same direction controls pitch and wherein the environmental condition is wind.

44. The tethered aerostat of claim 42 wherein turning the motor and the second motor in an opposite direction controls yaw wherein the environmental condition is a weather front.

45. The tethered aerostat of claim 44 further comprising a third loop having one end connected to the motor and the other end connected to the second motor or having one end connected to the aerostat and the other end connected to the aerostat.

46. The tethered aerostat of claim 45 further comprising a third motor with an integrated four stage planetary reduction gear set operatively connected to the third loop controlled by the computer to control roll of the aerostat.

47. The tethered aerostat of claim 40 further comprising moveable rudder and elevator devices disposed on a tail of the aerostat controlled by the computer.

48. The tethered aerostat of claim 40 further comprising a canard connected to the loop.

49. The tethered aerostat of claim 40 further comprising a lift gas feed tube.

50. The tethered aerostat of claim 49 wherein the gas feed tube is connected to a ground and a ground based heater to heat the lift gas.

* * * * *